US012716873B2

(12) United States Patent
Eliahoo et al.

(10) Patent No.: US 12,716,873 B2
(45) Date of Patent: Aug. 25, 2026

(54) NON-CONTACT ULTRASOUND VISCOELASTIC SPECTROSCOPY

(71) Applicant: UNIVERSITY OF SOUTHERN CALIFORNIA, Los Angeles, CA (US)

(72) Inventors: Payam Eliahoo, Los Angeles, CA (US); Bo Han, Temple City, CA (US); Richard Leahy, Los Angeles, CA (US); Kirk Shung, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 197 days.

(21) Appl. No.: 18/280,932

(22) PCT Filed: Mar. 17, 2022

(86) PCT No.: PCT/US2022/020740

§ 371 (c)(1),
(2) Date: Sep. 7, 2023

(87) PCT Pub. No.: WO2022/197918

PCT Pub. Date: Sep. 22, 2022

(65) Prior Publication Data

US 2024/0159715 A1 May 16, 2024

Related U.S. Application Data

(60) Provisional application No. 63/163,013, filed on Mar. 18, 2021.

(51) Int. Cl.

*G01N 29/34* (2006.01)
*G01N 11/00* (2006.01)
*G01H 9/00* (2006.01)

(52) U.S. Cl.

CPC .......... *G01N 29/343* (2013.01); *G01N 11/00* (2013.01); *G01H 9/008* (2013.01);

(Continued)

(58) Field of Classification Search

None

See application file for complete search history.

(56) References Cited

U.S. PATENT DOCUMENTS

| | | | | |
|---|---|---|---|---|
| 3,699,808 A | 10/1972 | Ford et al. | | |
| 2009/0259107 A1* | 10/2009 | Crenshaw | ................ | A61B 7/00 600/202 |

(Continued)

FOREIGN PATENT DOCUMENTS

| | | | |
|---|---|---|---|
| EP | 0681175 B1 * | 10/2001 | ............... G01N 3/08 |
| JP | 2007-152074 | 6/2007 | |

OTHER PUBLICATIONS

International Search Report and Written Opinion (mailing date Jun. 28, 2022) for corresponding International Application No. PCT/US2022/020740, filed Mar. 17, 2022.

*Primary Examiner* — John E Breene
*Assistant Examiner* — Alex T Devito
(74) *Attorney, Agent, or Firm* — Snell & Wilmer LLP

(57) ABSTRACT

A system, apparatus, method, algorithm and/or device (collectively, “system”) for non-contact or contactless ultrasound viscoelastic spectroscopy measures the viscoelastic properties of soft matter through exerting modulated ultrasound pressure waves, so called stress signals and measuring the material deformation, so called strain imaging, over a wide range of frequencies, and may be applied to various fields including but not limited to material science, polymer designing, tissue engineering, cancer drug development and/or biological tissue assessment for disease diagnosis and prognosis. By measuring the elastic and viscous moduli, the phase difference between them, and Poisson’s ratio over a wide range of frequencies, this allows for non-destructive tests on soft matter such as biological tissue, by ultrasound probes.

13 Claims, 20 Drawing Sheets

(52) U.S. Cl.
CPC ................ *G01N 2011/0073* (2013.01); *G01N 2203/0075* (2013.01); *G01N 2203/0094* (2013.01); *G01N 2291/02818* (2013.01); *G01N 2291/02827* (2013.01); *G01N 2291/044* (2013.01)

(56) References Cited

U.S. PATENT DOCUMENTS

| | | | |
|---|---|---|---|
| 2013/0218012 | A1 | 8/2013 | Specht et al. |
| 2017/0333004 | A1 | 11/2017 | Yoshikawa |
| 2019/0328364 | A1 | 10/2019 | Questa et al. |

* cited by examiner

| | Score | Pattern | | Elastogram | B-mode | |
|---|---|---|---|---|---|---|
| Benign | 1 | | | | | Entire hypoechoic area is soft |
| ↕ | 2 | | | | | Part of hypoechoic area is hard |
| | 3 | | | | | Only inside of margin of hypoechoic area is soft |
| | 4 | | | | | Entire hypoechoic area is hard |
| Malignant | 5 | | | | | Hypoechoic area and surrounding area are hard |
| | BGR | | | | | In the case of cysts, a specific blue-green-red pattern (BGR sign) is seen |

1207

1503

NON-CONTACT ULTRASOUND VISCOELASTIC SPECTROSCOPY

CROSS-REFERENCE TO RELATED APPLICATIONS

This application is based upon and claims priority to U.S. provisional patent application 63/163,013 entitled "NON-CONTACT ULTRASOUND VISCOELASTIC SPECTROSCOPY" and filed on Mar. 18, 2021, the entire content of which is incorporated herein by reference.

BACKGROUND

1. Field

This disclosure relates generally to ultrasound spectroscopy, and more specifically, to non-contact ultrasound viscoelastic spectroscopy.

2. Description of the Related Art

Frequently, there is a need to measure viscoelastic properties of materials. However, existing mechanisms for measuring viscoelastic properties of a material may be destructive to the sample. For instance, a mechanical rheometer presses a sample between plates under an axial load and then rotates one plate to generate shear deformation. This technique carries a high likelihood of damaging the material sample. Moreover, there is often a desire to characterize local mechanical properties at multiple locations across a sample. For instance, a biological tissue sample can be characterized, and potential cancerous regions identified by measuring viscoelastic properties across the sample. Thus, there is a need for systems and methods of non-contact ultrasound viscoelastic spectroscopy.

SUMMARY

A non-contact method to quantify the viscoelastic properties of a material is provided. The method may include applying, using one or more transducers, stress to a material. The method may include imaging, using the one or more transducers, deformation to the material due to the stress applied to the material. The method may include measuring or determining, by a controller, elastic modulus, viscous modulus and Poisson's ratio of the material based on the deformation to the material. The method may include providing, by the controller, the elastic modulus, the viscous modulus, and Poisson's ratio of the material to a user.

The method may include other aspects as well. For instance, applying the stress to the material may include emitting, by the one or more transducers, ultrasonic energy directed at the material to deform the material. The method may include calibrating, using the controller, the one or more transducers to maximize the deformation to the material due to the stress applied. The method may include calibrating the one or more transducers as mentioned. The calibrating may include receiving, from the one or more transducers, a reflection of the ultrasonic energy directed at the material, and adjusting, using the controller, a position of the one or more transducers to maximize an amount of the reflection of the ultrasonic energy that is received. The method may include measuring or determining a phase difference between the elastic modulus and the viscous modulus of the material.

In various embodiments, the one or more transducers are not in contact with the material to preserve the integrity and prevent the destruction of the material. In various instances, applying, using one or more transducers, stress to the material is done over a period of time and measuring or determining the elastic modulus, the viscous modulus, and Poisson's ratio of the material includes measuring or determining a time response of the deformation to the material due to the stress applied over the period of time. The time response may correspond to the elastic modulus and to the viscous modulus of the material and a faster time response indicates that the material is more elastic, and a slower time response indicates that the material is more inviscid.

In various embodiments, the material deformation pattern indicates the Poisson's ratio. The Poisson's ratio may be calculated from the material deformation pattern indicate the material internal stress.

A non-contact system to quantify the viscoelastic modulus of a material is provided. The system may include a first ultrasound transducer configured to emit ultrasonic energy to deform a material. The system may include a second ultrasound transducer configured to image the material deformation. The system may include a controller coupled to the first ultrasound transducer and the second ultrasound transducer. The controller may be configured to apply, using the first ultrasound transducer, the ultrasonic energy to the material. The controller may be configured to obtain, from the second transducer, the image of the material deformation. The controller may be configured to determine elastic modulus, viscous modulus, and Poisson's ratio of the material based the image. The system may have a display configured to display the elastic modulus, the viscous modulus, and Poisson's ratio to a user.

The system may have other aspects. For example, the controller may be configured to determine an amount of deformation of the material due to stress applied to the material and based on the image of the material deformation. The controller may be configured to determine the elastic modulus, the viscous modulus, and Poisson's ratio based on the deformation. The system may have a third ultrasound transducer configured to receive a reflection of the ultrasonic energy used to deform the material. The controller is further coupled to the third ultrasound transducer and is further configured to measure the reflection of the ultrasonic energy and position the first ultrasound transducer to calibrate a position of the first ultrasound transducer based on the measurement of the reflection of the ultrasonic energy. The system may include a platform. The platform may be movable. The platform may hold, position and orient the material relative to the first ultrasound transducer and the second ultrasound transducer.

In various embodiments of the system, the first ultrasound transducer, the second ultrasound transducer and the third ultrasound transducer is positioned a distance away from the material such that the first ultrasound transducer, the second ultrasound transducer and the third ultrasound transducer are not in contact with the material and not destructive to the material. In various embodiments of the system the controller is configured to apply the ultrasonic energy to the material over a period of time and determine a time response of the elastic modulus, the viscous modulus, and Poisson's ratio of the material due to the applied ultrasonic energy to the material over the period of time. Moreover, the controller may be configured to render, on the display, the time response of the elastic modulus, the viscous modulus, and Poisson's ratio to the user. The controller may measure a phase difference between the elastic modulus and the viscous modulus. The controller determines the viscous modulus in a range of frequencies of approximately 0.01 Hz or less up to approximately 1 kHz or more.

The transducers may have various configurations. The system may include a third ultrasound transducer configured to receive a reflection of the ultrasonic energy, wherein the first, the second and third ultrasound transducers have the same dimensions, the same resonance frequency and the same power output. The system may include a third ultrasound transducer configured to receive a reflection of the ultrasonic energy, wherein the first, the second and third ultrasound transducers might have different dimensions, different resonance frequency and different power output. The system may include a third ultrasound transducer configured to receive a reflection of the ultrasonic energy, wherein the first, the second and third ultrasound transducers have at least one different dimension, frequency or power output. The system may include a third ultrasound transducer configured to receive a reflection of the ultrasonic energy, wherein the first ultrasound transducer is positioned at an oblique angle with respect to the surface of material. The oblique angle between the first ultrasound transducer and the surface of material may be approximately between 0° to 90°. The second ultrasound transducer may be positioned perpendicular with respect to the surface of material. The third ultrasound transducer may be positioned symmetrical to the first ultrasound transducer over the axis of the second ultrasound transducer.

The ultrasound transducers may be miniaturized to fit inside of a medical catheter for applications such as but not limited to endoscopy and laparoscopy. Several miniaturized ultrasound transducers may be arranged in a 1D or 2D array to measure viscoelastic properties of multiple materials simultaneously. The controller may be configured to determine viscoelastic properties of several materials simultaneously.

A computer-readable medium (CRM) is provided. The CRM may store instructions that when executed by a controller cause the controller to perform a method for quantifying the viscoelastic properties of a material. The method may include applying, using one or more transducers, stress to a material, and imaging, using the one or more transducers, deformation to the material due to the stress applied to the material. The method may include measuring or determining, by a controller, elastic modulus, viscous modulus and Poisson's ratio of the material based on the deformation to the material. The method may include providing, by the controller, the elastic modulus, the viscous modulus, and Poisson's ratio of the material to a user.

BRIEF DESCRIPTION OF THE DRAWINGS

Other systems, methods, features, and advantages of the present invention will be or will become apparent to one of ordinary skill in the art upon examination of the following figures and detailed description.

DETAILED DESCRIPTION

Figure 1:
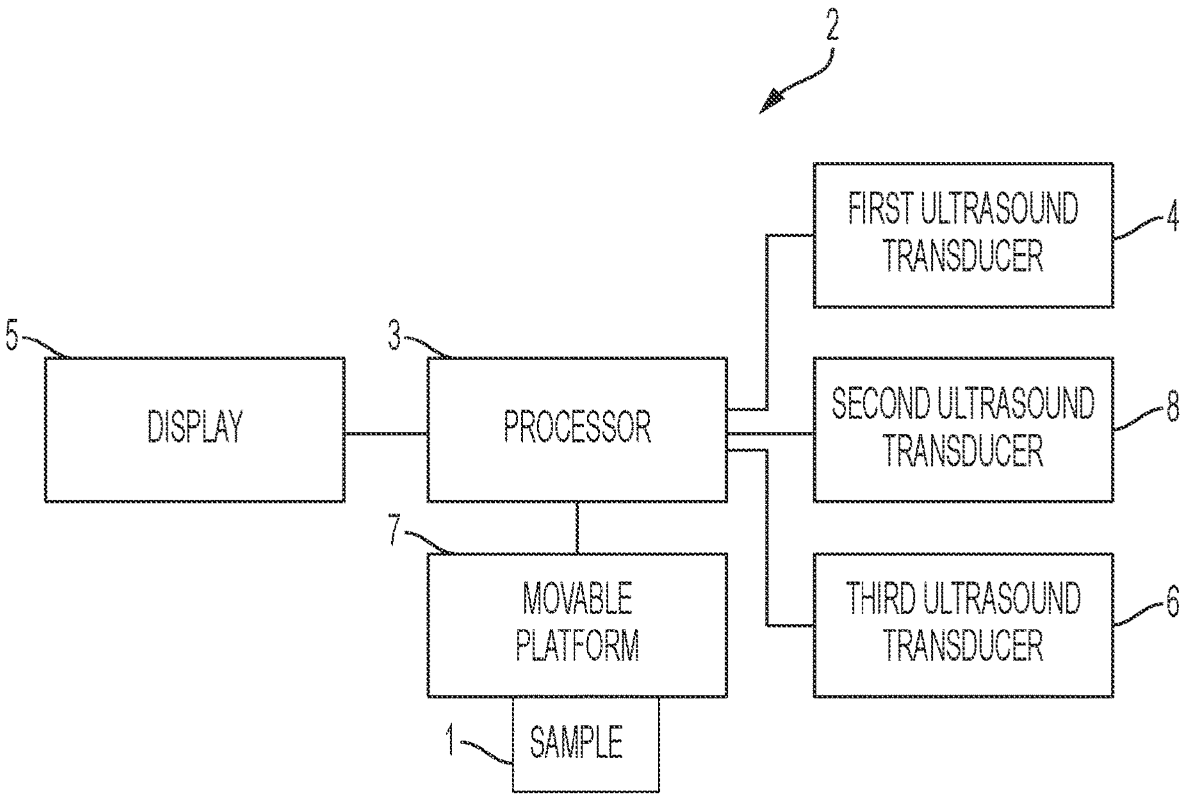
FIG. 1 depicts a block diagram of a noncontact ultrasound viscoelastic spectroscope system, in accordance with various embodiments.

A system, apparatus, method, algorithm and/or device (collectively, "system") for non-contact or contactless ultrasound viscoelastic spectroscopy is provided. The non-contact or contactless ultrasound viscoelastic spectroscopy system measures the viscoelastic properties of soft matter through exerting modulated ultrasound pressure waves, so called stress signals and measuring the material deformation caused by the stress signal, so called strain imaging, over a wide range of frequencies, and may be applied to various fields including but not limited to material science, polymer designing, tissue engineering, cancer drug development and/or biological tissue assessment for disease diagnosis and prognosis. By measuring the elastic and viscous moduli, the phase difference between them, and Poisson's ratio over a wide range of frequencies, this allows for non-destructive tests on soft matter such as biological tissue, by ultrasound probes. This system, apparatus and method is versatile as such that it measures the soft matter response to step function stress, dynamic response to a wide range of stress frequencies, as well as any arbitrary user defined stress signal. The non-contact or contactless ultrasound viscoelastic spectroscopy is described as set forth herein.

The disclosure provides a non-contact method to quantify the viscoelastic properties of soft material. The system is designed to measure both elastic modulus and viscous modulus of soft matter in a way that their phase difference can be measured as well. The system can measure viscoelastic properties in a range of frequencies for example from 0.1 Hz or less to 1 KHz or more. Therefore, it provides complete viscoelastic spectroscopy. It can also measure the step response of the material under test.

In various example embodiments, one ultrasound transducer is used to apply stress and another ultrasound transducer is used for strain imaging. Another transducer may be used measure the reflection of stress signal for alignment purposes. Notably, the set of transducers does not come in physical contact with the material but is placed a few millimeters above the surface of material. Therefore, the measurement is not destructive, and the sample can be preserved for future testing. This system is useful for tissue engineering, cancer drug development, and biological tissue assessment for disease diagnosis and prognosis. Other applications include material science, polymer development and non-destructive test on soft matters.

As mentioned, a set of ultrasound transducers apply stress, measure strain, and measure reflected stress signals to facilitate alignment. The stress signal is generated by amplitude modulation of a very low frequency signal in the range of 0.1 Hz to 100 Hz, as an example, by a high frequency signal that is a transducer resonance frequency. In this system a 25 MHz transducer is designed resonant at 25 MHz, but this technique is not limited to 25 MHz transducers. It can be used for any transducer. The ultrasound transducers are designed at a 25 MHz center frequency from Lithium Niobate material in circular shape with 4 mm diameter. They are pressed focused at a 6 mm focal point.

Referring now to FIG. 1, a block diagram of a non-contact ultrasound viscoelastic spectroscope system 2, is provided. The non-contact ultrasound viscoelastic spectroscope system 2 includes a controller 3. The controller 3 may include a computer processor configured to control ultrasound transducers, such as by driving them with various waveforms, impulses, etc. and at various amplitudes. The controller 3 may include other circuits as well, such as will be described in connection with FIGS. 4 and 5 in paragraphs below. The controller 3 may also monitor ultrasound transducers, such as to receive detected signals from ultrasound transducers. Thus, the controller 3 may both transmit and receive signals via ultrasound transducers. The non-contact ultrasound viscoelastic spectroscope system 2 may include a display 5. The display 5 comprises any human-machine interface whereby a human may receive information from the controller 3 or provide information to the controller 3. For instance, the display 5 may be a computer monitor, a monitor and keyboard, a monitor and mouse, a touch screen, or any other human-machine interface. The controller 3 may be connected to a movable platform 7. A movable platform 7 may hold a sample 1 being stimulated by the ultrasound transducers. In response to instructions from the controller 3, the movable platform 7 may move to position the sample 1 in a desired orientation for ultrasonic stimulation. Finally, the non-contact ultrasound viscoelastic spectroscope system 2 may include the aforementioned transducers. In various embodiments, a first ultrasound transducer 4, a second ultrasound transducer 8, and a third ultrasound transducer 6 are provided, though any number of ultrasound transducers may be implemented, as desired.

Figure 2:
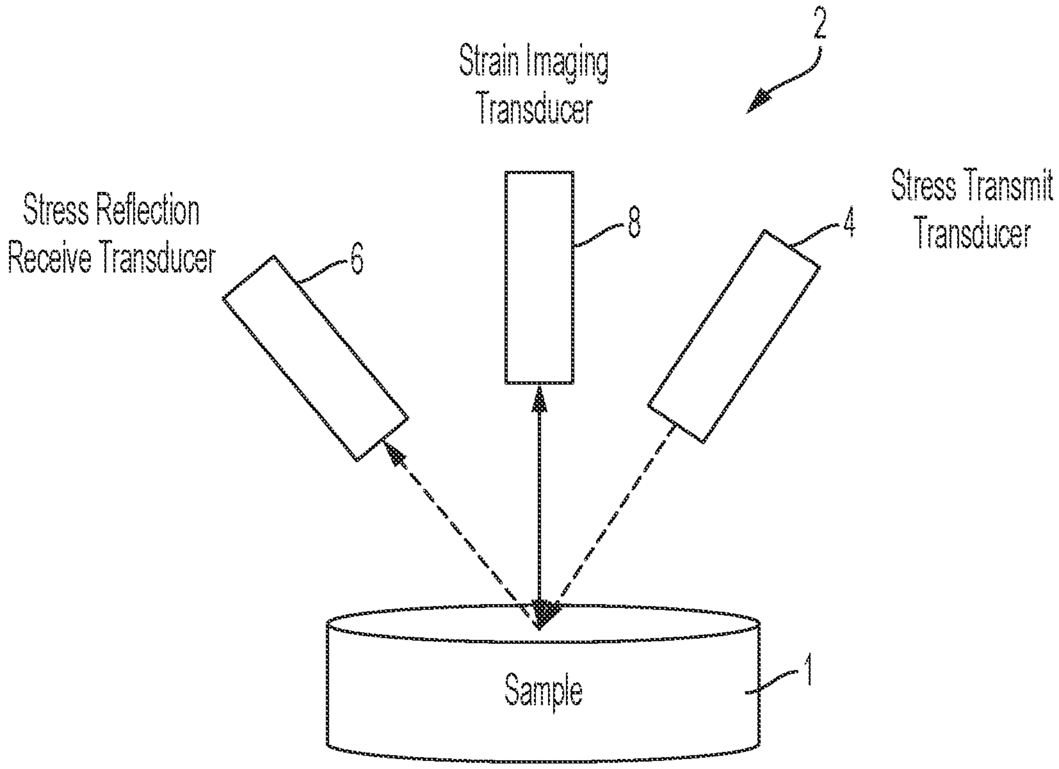
FIG. 2 depicts an illustration of an example arrangement of ultrasound transducers, in accordance with various embodiments.

Turning attention to FIG. 2, a more specific illustration of the ultrasound transducers is provided. The first ultrasound transducer 4 may be a stress transmission transducer. The stress transmission transducer may emit ultrasonic waves that stimulate a sample 1, exerting stress on the sample 1. The sample 1 may be a biological material, such as a tissue sample, or a cell culture, or any type of material desired to be tested. The second ultrasound transducer 8 may be a strain imaging transducer. The strain imaging transducer receives ultrasonic waves from the stimulated sample 1 that correspond to a strain induced into the sample 1. Finally, the third ultrasound transducer 6 may be a stress reflection transducer. The stress reflection transducer may receive reflected ultrasonic waves corresponding to the ultrasonic waves from the stress transmission transducer that reflect off of the sample 1. A signal generated by this transducer may be utilized by the controller 3 (FIG. 1) to determine a proper positioning of the sample 1 relative to the transducers. The controller 3 may drive the movable platform 7 (FIG. 1) to move the sample 1 relative to the transducers.

Figure 3:
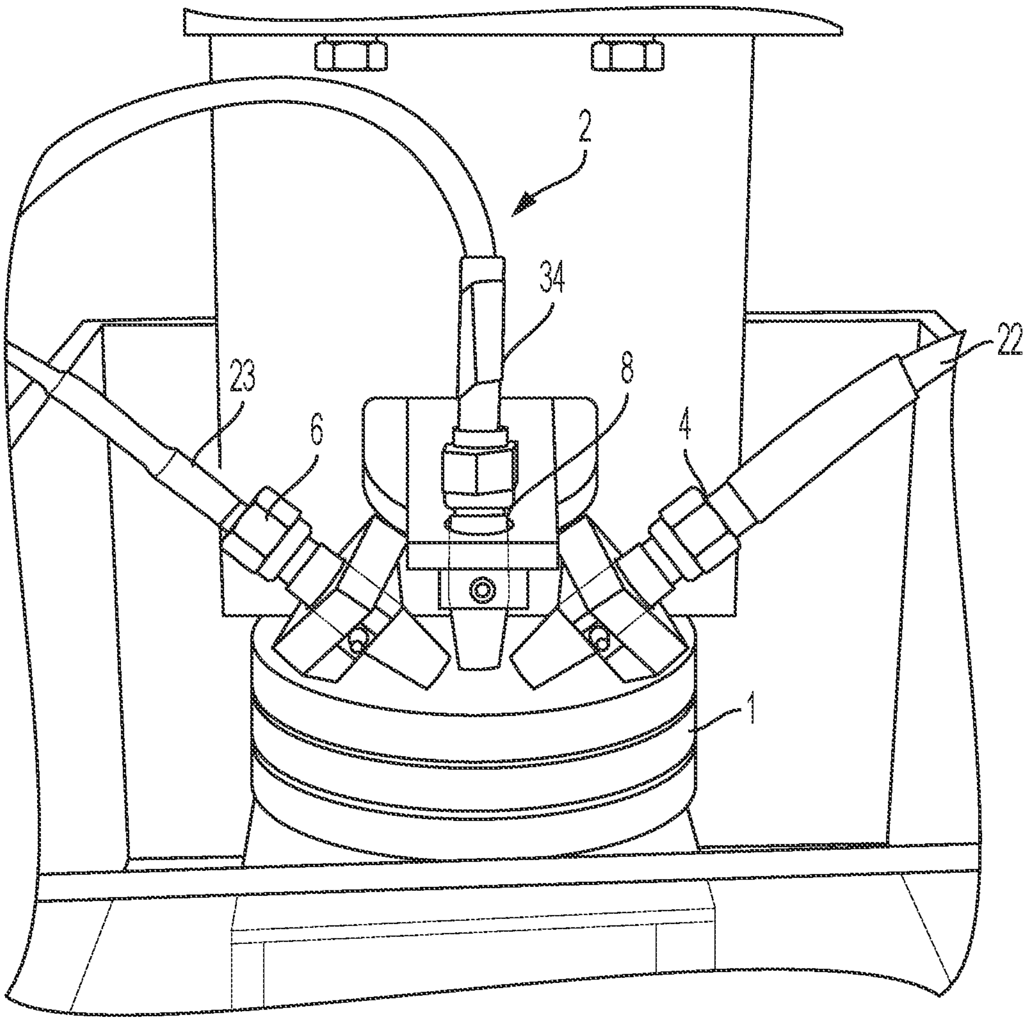
FIG. 3 depicts one example practical implementation of components of a noncontact ultrasound viscoelastic spectroscope system, in accordance with various embodiments.

With reference to FIG. 3, one example embodiment of a practical implementation of the non-contact ultrasound viscoelastic spectroscope system 2 is shown. A first ultrasound transducer 4 (stress transmission transducer) (FIG. 1) stimulates a sample 1 with ultrasonic waves, exerting stress on the sample 1. A second ultrasound transducer 8 (strain imaging transducer) detects strain induced in the sample 1. A third ultrasound transducer 6 (stress reflection transducer) detects reflected ultrasonic waves generated by the first ultrasound transducer 4 (stress transmission transducer) and reflected from the sample 1 so that the controller may interpret these reflected ultrasonic waves to determine if the sample 1 is properly positioned. The first ultrasound transducer 4 (stress transmission transducer) is connected to the controller by a first coax cable 22, the second ultrasound transducer 8 (strain imaging transducer) is connected to the controller by a second coax cable 34, and the third ultrasound transducer 6 (stress reflection transducer) is connected to the controller by a third coax cable 23.

Figure 4:
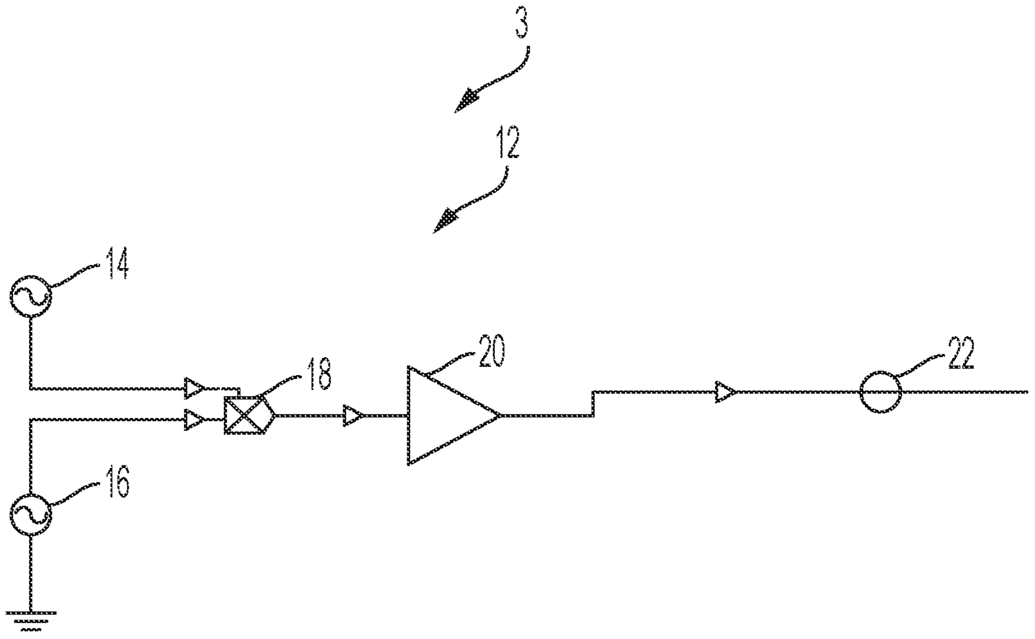
FIGS. 4 and 5 depicts electronic circuits of a controller of a noncontact ultrasound viscoelastic spectroscope system, in accordance with various embodiments.
Figure 5:
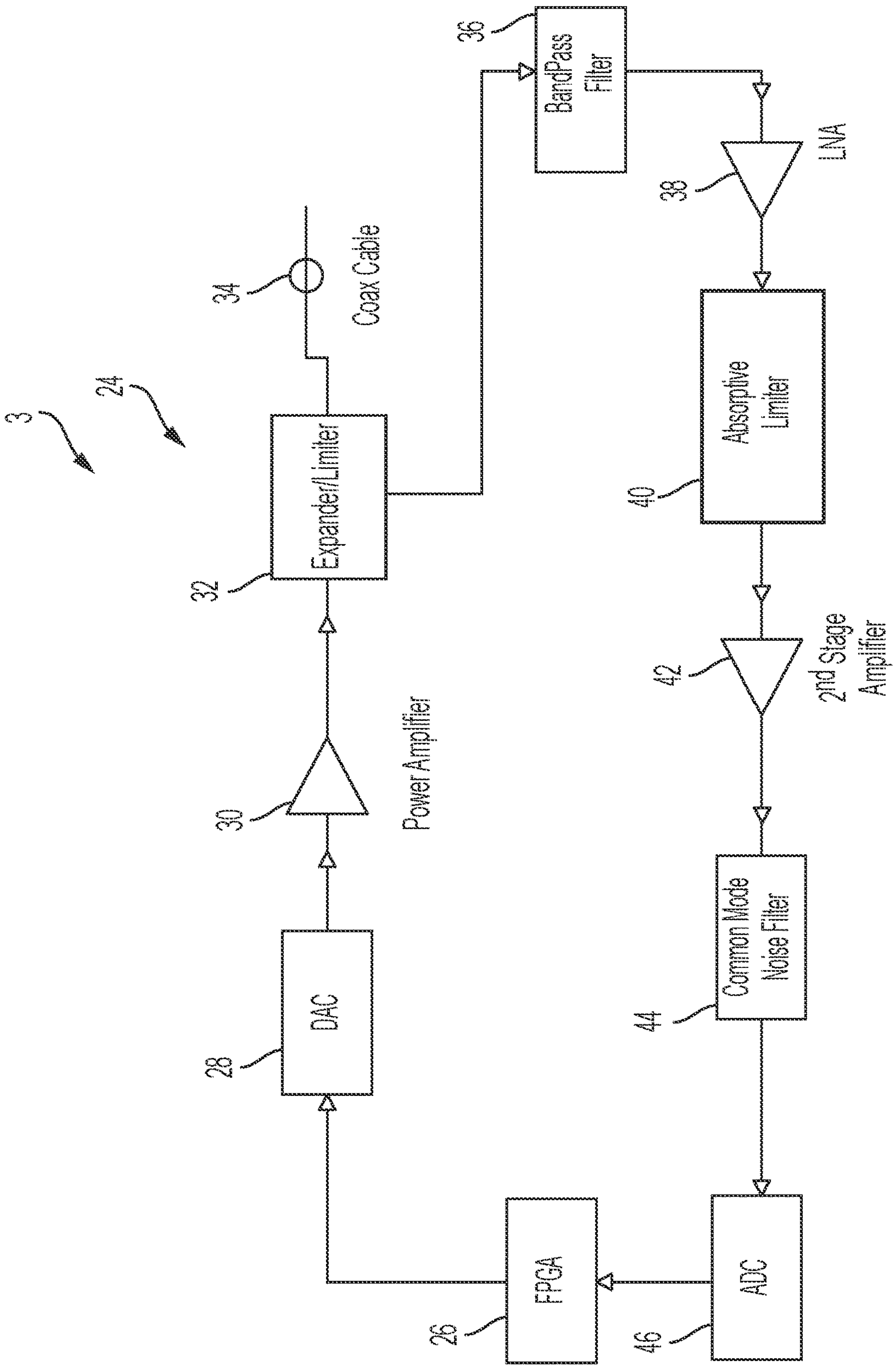

Turning now to FIG. 4, the controller 3 may include various electronic circuits. For example, the controller 3 may include a stress imaging excitation signal generation circuit 12. This circuit may be an aspect of the controller 3. Thus, one may appreciate that the controller 3 may include other aspects in addition to a computer processor. The stress imaging excitation signal generation circuit 12 is an electronic circuit configured to generate the signal provided to the first ultrasound transducer 4 (stress transmission transducer) to stimulate the sample and exert stress on the sample. The stress imaging excitation signal generation circuit 12 may include a function generator 16. A function generator 16 comprises a device that generates a waveform having an arbitrary shape. The function generator 16 may generate pulses, such as square wave pulses, or may generate impulses, or may generate ramping functions, or sinusoidal functions, or any function as desired. The stress imaging excitation signal generation circuit 12 may also include an oscillator 14. An oscillator 14 is a circuit that generates a periodic waveform, such as a sine wave, a square wave, a triangle wave, a pulse-width modulated wave, and/or the like. The stress imaging excitation signal generation circuit 12 includes a mixer 18. The mixer 18 is connected to both the oscillator 14 and the function generator 16 and mixes the two signals together so that the periodic waveform generated by the oscillator 14 is modulated by the function generated by the function generator 16. The mixer 18 outputs this modulated signal to a power amplifier 20. A power amplifier 20 comprises an electronic component that increases the amplitude of the modulated signal to create a transducer driving signal. The power amplifier 20 is connected to a first coax cable 22 which then communicates the transducer driving signal to the first ultrasound transducer 4 (stress transmission transducer) (FIG. 1).

The controller 3 (FIG. 1) may also include a strain imaging measurement system 24. The strain imaging measurement system 24 receives the signal detected by the second ultrasound transducer 8 (strain imaging transducer) (FIG. 1) and processes it so that a measurement of a corresponding strain induced in a sample is performed. The strain imaging measurement system 24 has a variety of electronic components. For example, the strain imaging measurement system 24 may have a processor, such as a field programmable gate array (FPGA) 26. Other types of processors are also contemplated. The FPGA 26 generates a signal. The signal may be a digital signal. The digital signal is provided to a digital-to-analog converter (DAC) 28. The DAC converts the digital signal to an analog signal. The analog signal is provided to a power amplifier 30 which increases the amplitude of the analog signal. The power amplifier 30 is connected to an expander/limiter 32. The expander/limiter 32 connects to the second coax cable 34 leading to the second ultrasound transducer 8 (strain imaging transducer) (FIG. 1). The expander/limiter 32 also connects, through other components discussed below, to the FPGA 26. The expander/limiter 32 may adjust characteristics of the transmitted analog signal and may provide isolation between transmit and receive paths. For instance, a same transducer may both transmit the transmitted analog signal, and receive reflected signals corresponding to behavior of a sample 1. The expander/limiter 32 is connected to the FPGA 26 through a bandpass filter 36. The bandpass filter 36 attenuates received signals outside a desired pass band. The bandpass filter 36 connects to a low noise amplifier (LNA) 38. The LNA 38 amplifies a received signal to increase the signal to noise ratio prior to further processing. The LNA 38 connects to an absorption limiter 40. The absorption limiter 40 selectively attenuates or limits large-amplitude incident signals from blocking smaller-amplitude signals at other frequencies. This ameliorates any corresponding receiver desensitization that may impede processing of the received signal due to a presence of other large amplitude signals. The absorption limiter 40 connects to a second stage amplifier 42. The second stage amplifier 42 further increases the strength of the received signal. The second stage amplifier 42 connects to a common mode noise filter 44. The common mode noise filter 44 attenuates common mode noise. The common mode noise filter 44 connects to an analog-to-digital converter (ADC) 46. The ADC 46 converts the analog received signal into a digital signal. The ADC 46 connects to the FPGA 26 and provides the digital signal corresponding to the analog received signal to the FPGA 26, which then processes it to determine a strain exhibited by the sample 1 (FIG. 1).

Figure 6A:
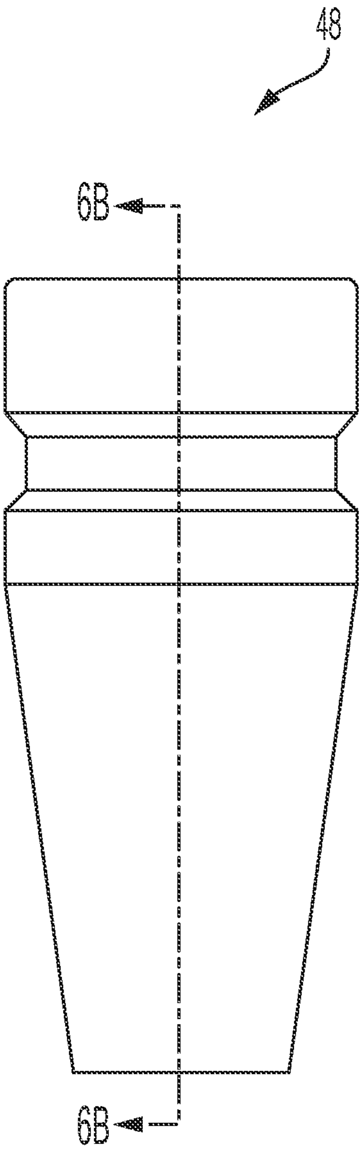
FIGS. 6A-B depict views of a physical structure of a transducer, in accordance with various embodiments.
Figure 6B:
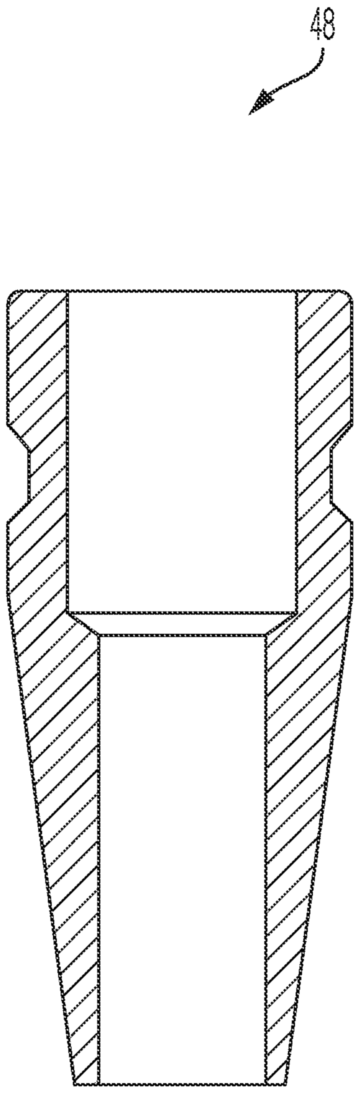

Referring now to FIG. 3 and FIGS. 6A-B, the first ultrasound transducer 4, second ultrasound transducer 8, and third ultrasound transducer 6 may each have a physical structure. In various embodiments, the physical structure of each transducer may be transducer body 48. The transducer body 48 may be the same for each transducer. In further instances, the transducer body 48 of one or more transducer may be different from that of one or more other transducer. In various embodiments, each transducer has a same physical structure corresponding to a side view and a cutaway view of a transducer body 48 illustrated in FIGS. 6A and 6B, respectively.

Figure 7:
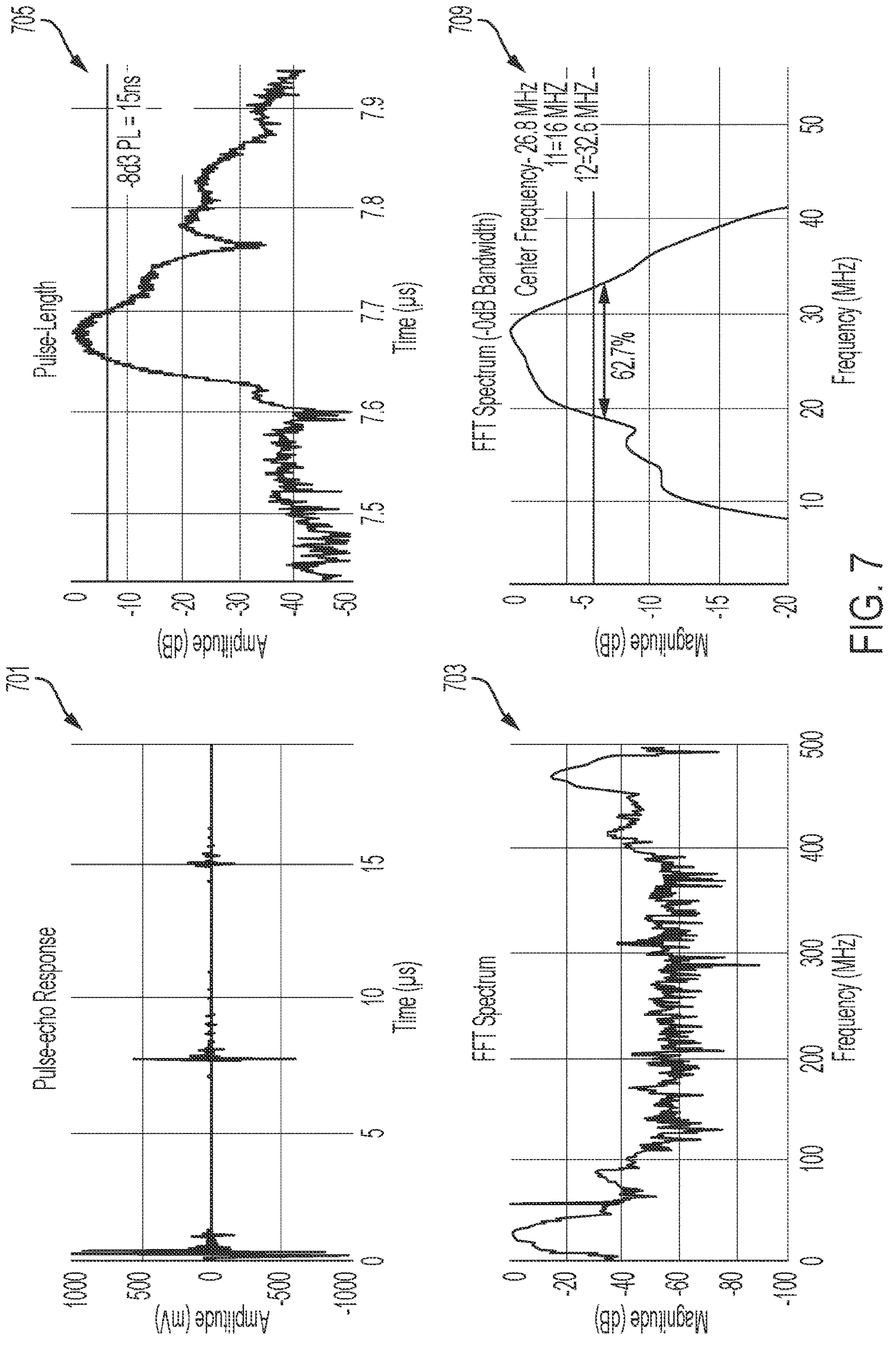
FIG. 7 shows various charts of transducer behavior, in accordance with various embodiments.

Referring now to FIGS. 6A-B and FIG. 7, each transducer body 48 may cause the transducer to exhibit various physical properties. For instance, chart 701 illustrates a pulse-echo response with amplitude on a Y-axis and time on a X-axis. Chart 703 illustrates a fast Fourier transform (FFT) spectrum with magnitude on a Y-axis and frequency on a X-axis. Chart 705 illustrates a chart of pulse length with amplitude on the Y-axis and time on the X-axis. Chart 709 illustrates a FFT spectrum associated with a zoomed in bandwidth centered on a center frequency of the transducer body 48, showing magnitude on a Y-axis and frequency on an X-axis. These charts 701, 703, 705, 709 characterize signal performance of the transducer body 48 manufactured according to the design of FIGS. 6A-B.

Thus, and referring to all of FIGS. 1-6B, various embodiments of the system 2 may be provided. One non-limiting example embodiment is detailed below. A non-contact ultrasound viscoelastic spectroscope system 2 (a contactless system 2) may include a first ultrasound transducer 4, a second ultrasound transducer 8, and a controller 3. The first ultrasound transducer 4 emits ultrasonic energy to deform a material (sample 1). The second ultrasound transducer 8 images the material deformation. The controller 3 is coupled to the first ultrasound transducer 4 and the second ultrasound transducer 8. The controller 3 is configured to perform several steps. The controller 3 is configured to apply, using the first ultrasound transducer 4, the ultrasonic energy to the material, obtain from the second transducer the image of the material deformation, and determine various properties based on the image. These properties may be elastic modulus, viscous modulus, the Poisson's ratio of the material, and other properties. Finally, the contactless system 2 may also have a display 5. The display 5 may display 5 the elastic modulus, the viscous modulus, and Poisson's ratio to a user.

The controller 3 may be configured to do additional aspects. The controller 3 may be configured to determine an amount of deformation of the material due to stress applied to the material and based on the image of the material deformation. The controller 3 may determine the elastic modulus, the viscous modulus, and Poisson's ratio based on the deformation. The controller 3 may determine the viscous modulus in a range of frequencies of about 0.01 Hz or less to about 1 KHz or more.

In some instances of the example embodiment, a third ultrasound transducer 6 is provided and is configured to receive a reflection of the ultrasonic energy used to deform the material. The controller 3 may also be coupled to this third ultrasound transducer 6 and may measure the reflection of the ultrasonic energy and position the first ultrasound transducer 4 (such as by moving a movable platform 7 to calibrate the position of the first ultrasound transducer 4 based on the measurement of the reflection of the ultrasonic energy. The platform may hold both the first ultrasound transducer 4 and also the second ultrasound transducer 8. In various embodiments, the first ultrasound transducer 4, the second ultrasound transducer 8, and the third ultrasound transducer 6 are positioned a distance away from the material so that they do not contact the material.

These different ultrasound transducers may be positioned at relative angles to each other. For instance, the third ultrasound transducer 6 that receives a reflection of the ultrasonic energy can be at an oblique angle with respect to a surface of the sample 1. The oblique angle may be between about 0 and about 90 degrees. The second ultrasound transducer 8 can be positioned perpendicular to a surface of the sample 1. The third ultrasound transducer 6 and first ultrasound transducer 4 may be positioned symmetrically about an axis of the second ultrasound transducer 8. These transducers may have a same dimension, same resonance frequency, and same power output, or may have one or more different dimension, resonant frequency, or power output. In some instances, the transducers are miniaturized to fit inside of a medical catheter for applications such as (but not limited to) endoscopy and laparoscopy. Several miniaturized ultrasound transducers may be arranged in a 1D or 2D array to measure viscoelastic modulus of multiple samples or portions of a sample 1 simultaneously, and corresponding, the controller 3 may determine these viscoelastic modulus of the several samples or portions of the sample 1 simultaneously.

Having introduced the provided system 2, the detailed description now shifts to a discussion of operative principles of the provided system 2 as it applies the operative principles. Specifically, the discussion now shifts to consideration of viscoelasticity in soft matter. External forces on a body of material result in either movement of the body as a whole, or motion in some particles called deformation. This discussion studies the second case. The deformation can be reversible (elastic) or irreversible (viscous, flow, plastic, or fracture). Rheology studies the behavior of the material in form of constitutive equations for the purpose of specifying the properties of material independent of size or shape, only on its nature. When a material is subjected to an input of energy, some part of energy is stored, and some part is dissipated. That is a simple consequence of second law of thermodynamics. Because the dissipation never takes place instantly, the material properties are time dependence. The dissipation happens due to viscous mechanisms and therefore, the response of a material lags behind the excitation. The length of lag or delay depends on the duration of excitation. If the excitation is very short, material molecules do not have sufficient time to rearrange and if the excitation is very long there is sufficient time for molecules to rearrange.

Almost all materials show both elastic and viscous modulus and therefore are called viscoelastic material. When the excitation energy (input energy) is small, materials behave in a region called linear viscoelasticity or linear time dependency. When the input energy is high, the behavior of material becomes nonlinear. An important feature of viscoelastic behavior is the time dependency property of the material. This disclosure discusses linear viscoelasticity and provides a technique to quantify viscoelastic properties of a material.

Several constitutive equations can be adopted to describe viscoelasticity. For instance, performing a simple experiment, consider a uniform cylinder of a homogenous and isotropic material. Applying a tensile force of compression force in the axis of the rod causes deformation in the form of extension or elongation which are the simplest form of deformation. L0 is the original length of the rod and L is the deformed length.

If L0 is an original length of a cylindrical rod and L is the deformed length, $\Delta L = L - L0$. Relative elongation can be expressed by $\gamma = \Delta L/L0$ which is also called tensile strain. Tensile stress is called the force applied on unit surface area, $a = f/A0$. For a Hookean solid or purely elastic material the relationship between $\sigma$ and $\gamma$ can be written as $E = \sigma/\gamma$. E is a constant and known as modulus of elasticity or elastic modulus, also known as Young modulus or stiffness. Shear compliance, J, is defined as $J = \gamma/\sigma$.

If the force is exerted tangentially on the material, the force may cause a different form of deformation. This force is called shear force and shear stress is defined by the tangential force over the surface area it is applied:

$$\tau = f/A.$$

The shear strain is defined by change in radians and shear modulus is defined as $G = \tau/\gamma$. For materials that are homogenous and isotropic, the shear modulus and Young modulus are related by: $G = E/(1+\nu)$. $\nu$ is called Poisson's ratio and is the ratio of lateral contraction to the elongation in the infinitesimally small uniaxial extension.

$$\text{Poisson's ratio: } \nu = \frac{\varepsilon_r}{\varepsilon_l}$$

Young's modulus:

$$C_{longitudinal} = \sqrt{\frac{K}{\rho}}$$

$$C_{shear} = \sqrt{\frac{G}{\rho}}$$

Consider the laminar flow of a purely viscous liquid. If the liquid is contained between two parallel plates and one plate moves at a constant velocity, at the steady state situation, the liquid velocity has a gradient depending the separation of plates. The constitutive equation is written as $\eta = \sigma/\varepsilon$. The coefficient of shear viscosity ($\eta$) or viscosity in short is a material property independent of its form and shape. The liquid materials obeying this constitutive equation are called Newtonian fluids.

Exerting stress on material rearranges particles inside the material and for any real material, a finite time is required for the rearrangements. The time of response to any excitation might be very short or very long. When the rearrangement takes place very quickly, the material is regarded as purely viscous and all the energy required to cause the deformation is dissipated as heat. When the material rearrangement takes a very long time, it is regarded as purely elastic material in which the energy is stored and can be recovered after releasing the force. Water is a nearly entirely viscous material, while steel is a nearly entirely elastic material. In real world, all real materials are viscoelastic meaning some portion of energy is stored, and some portion of energy is dissipated during the deformation of material. In a typical viscoelastic material, the time of rearrangement is comparable with the time of experiment. The Reiner number defines the ratio of the time scale of material to the experiment $ND = \tau_{mat}/\tau_{exp}$. Although the properties of crystals and rubbers can be expressed by stress and strain (at a fixed temperature) for the viscoelastic materials, "time" is another variable that needs to be introduced to the mathematical descriptions.

For a time-dependent material, the relation between shear stress and shear strain is given by: $\sigma(t) = G(t)\varepsilon 0$, where G(t) is called shear modulus or relaxation modulus. Another form of describing stress-strain relationship is by $\varepsilon(t) = J(t)\sigma 0$, where J(t) is creep compliance. J(t) and G (t) are not the inverse of each other, because material responds differently in time with stress excitation or strain excitation. The relation between G(t) and J(t) is given by $G(t)J(t) \leq 1$ and the equal sign is valid only when time is infinitely short or infinitely long.

It is important to note a difference between the viscoelasticity and plasticity. A deformed plastic material will not return to its original shape and form after stress is removed but a viscoelastic material will return to its origin after the deforming force is removed. Some materials might show a combination of elasticity and plasticity. They partly return to the origin and some permanent deformation remains in the material after removal of stress load.

The discussion now introduces creep and relaxation experiments. Experiments performed on viscoelastic materials are categorized into two major types: transient and dynamic. In the transient experiment, a sudden deformation is applied to the material and its response is observed over the time. The transient experiments can be done in two ways. One is to load the material with sudden stress and observe the deformation over the time. This test is called the creep test. Strain will change over the time with constant stress. Compliance is defined by strain over stress which is approximately inverse of stiffness and is noted by J(t).

The second type of transient experiment is called the stress-relaxation experiment. In this test, material goes under sudden deformation (controlled strain) and the stress that is required to sustain the deformation is measured over the time. Due to viscoelastic properties of the material, the stress required to keep the material at a constant deformation fades away, so it is called relaxation. Stress will change over time at a constant stain. G(t) is the shear modulus of the material.

The dynamic experiment is the one that either stress or strain is varied cyclically over the time and the response is observed at a range of frequencies of deformation. In practice transient experiments are often easier to perform and to understand.

Using the Boltzmann superposition principle, the representation of linear viscoelasticity can be done an integral form. Using the assembly of Hookean springs and Newtonian viscous elements (dashpots) as models, another representation of viscoelasticity is derived. This is called a differential representation because it forms a differential equation. Both integral and differential models serve only as models and they are not explanations of the material behavior. The mathematical formulas derived from these models help as a basis for prediction of behavior of material, but most materials cannot be described by simple spring and dashpot assembly. The other problem with a spring and dashpot approach is that it assumes linear responses for each component. The linear response can be obtained at strain less than 1%. Most biological materials are not linear. Also, they perform at higher rates of strain. Therefore, the spring-dashpot models show severe limitation in applications related to biological materials.

The Boltzmann superposition theory states the creep in a material is a function of the complete loading history and every additive load contributes to the total deformation. That means that material has some memory function, that shapes the response of material to the load. Also, if there is a slight increase or decrease to the load, the result will be the same as if the new load was applied to the unloaded material over the same amount of time. The Boltzmann superposition theory emphasizes linearity of the viscoelasticity property of the material. The Boltzmann principle offers a starting point for the model to be tested against the reality and may be refined to find better fitting parameters for the model. The mathematical formulation of viscoelastic behavior by the Boltzmann principle for a material with a compliance function of J(t) under stress $\sigma(t)$ and strain $\varepsilon(t)$ can be written by:

$$\varepsilon(t) = \int_{-\infty}^{t} J(t-\tau_n)d\sigma(\tau_n).$$

In the above equation the immediate elastic response is omitted. That part can be added, and the equation can be rewritten as follows:

$$\varepsilon(t) = \left[\frac{\sigma}{G_u}\right] + \int_{-\infty}^{t} J(t-\tau_n)\frac{d\sigma(\tau_n)}{d\tau_n}d\tau_n$$

where $G_u$ represents the immediate or unrelaxed stiffness.

This equation divides the response of material into time independent and time dependent integral form. The stress relaxation can be calculated in a similar way by:

$$\sigma(t) = [G_r\varepsilon] + \int_{-\infty}^{t} G(t-\tau_r)\frac{d\varepsilon(\tau_r)}{d\tau_r}d\tau_r.$$

This expression is often too simple when dealing with biological materials.

A differential form is also possible. The dashpot and spring components of mechanical modeling are probably the easiest starting point and the most acceptable among biologists. The springs represents Hookean behavior and dashpots represents Newtonian fluid. The combination of these two components in series is called a Maxwell model and in parallel is called a Kelvin model.

For the Maxwell model: $\sigma_1=E_m\varepsilon_1$ for the spring and $\sigma_2=\eta_{md}$ $d\varepsilon_2 dt$ because they are in series $\sigma_1=\sigma_2=\sigma$ and $\varepsilon=\varepsilon_1+\varepsilon_2$. Therefore, one can write:

$$\frac{d\varepsilon}{dt} = \frac{1}{E_m}\frac{d\sigma}{dt} + \frac{\sigma}{\eta_m}.$$

In a stress relaxation test, because $d\varepsilon=0$, and if there is initial stress $\sigma_0$, $\sigma$ over time can be obtained by following that shows stress decays exponentially with a time constant of $$\tau = \frac{E_m}{\eta_m}:$$

$$\sigma(t) = \sigma_0 \exp\left(-\frac{E_m}{\eta_m}t\right).$$

The Kelvin model using a similar argument gives the result to expression $$\left(\tau = \frac{E_m}{\eta_m}\right):$$

$$\varepsilon(t) = \varepsilon_0 \exp\left(-\frac{E_m}{\eta_m}t\right).$$

Both models and expressions clearly show symmetry between relaxation and creep test.

The limitation of a Maxwell model is that the model cannot be used for a creep test, because if a constant load is applied, the dashpot will allow viscous flow and the spring will be constantly in tension. Hence only the Newtonian fluid in dashpot is observed which is not what other experiments with real fluids show. Similar arguments can be made for the Kelvin model for the stress-relaxation test. Both models have limitations but by combining the two model in what that is called a Standard Linear model, both creep and relaxation tests can be described. The number of spring-dashpot can be increased for more sophisticated models, but still they remain in a linear region of viscoelasticity of the material.

One of the most important benefits of combining spring-dashpots to the standard model is to obtain a spectrum of time characteristic of the material. The relaxation spectrum is a very useful property of viscoelastic material and its mathematical derivation as follows. For a single Maxwell dashpot-spring the stress is given by: $\sigma(t)=E_m\varepsilon\exp(-t/\tau)$ and for a number of elements in parallel which all have the same strain, the total stress is $\sigma(t)=\varepsilon\Sigma E_n\exp(-t/\tau_n)$ where the $E_n$ and $\tau_n$ are the stiffness and relaxation time constant for the nth element respectively. In a general form, the relaxation stress can be written by:

$$\sigma(t)=[G_r\varepsilon]+\varepsilon\int_0^\infty f(\tau)\exp\left(-\frac{t}{\tau}\right)d\tau$$

The function $f(\tau)$ replaces the all the stiffness on all the elements. Therefore, the relaxation modulus is expressed by:

$$G(t)=G_r+\int_0^\infty f(\tau)\exp\left(-\frac{t}{\tau}\right)d\tau$$

In a logarithmic time scale, the relaxation time spectrum $f(\tau)$ is replaced by $H(\tau)$. Then $$G(t)=G_r+\int_0^\infty H(\tau)\exp\left(-\frac{t}{\tau}\right)d(\ln(\tau)).$$

An approximation of H $(\tau)$ is estimated by the following:

$$H(\tau)=-\left[\frac{dG(t)}{d\ln(t)}\right]_{t=\tau},$$

The relaxation of a single Maxwell element has a particular curve and if there are multiple elements it will take longer time for the material to relax. The slope of this curve versus the log of time is a shape of a skew log-normal distribution.

Both stress-relaxation and creep test can be executed easily, and measurements are also easily can be managed. But dynamic testing can accomplish much more because dynamic testing is versatile and covers a range of conditions even if the geometry of the material is challenging. Dynamic testing is suited for biological material that are nonlinear in nature but if the deformation is small enough the material can be considered linear in that region. In dynamic testing, the material is subjected to a stress or strain excitation that varies. In some embodiments, the excitation varies sinusoidally. If the material is purely elastic, the stress and strain functions have no delay or lag with respect to each other. For the purely elastic material, the stress versus strain plot will look like a straight line.

For a purely viscous material, the sinusoidal strain is proportional to the variation of acceleration in strain and therefore if y=sin (x) then dy/dx=cos (x). It means the stress lags the stain by 90° and the Lissajous figure is a circle.

For a viscoelastic material, the response is partly elastic and partly viscous. Therefore, the response to a sine excitation would be between the two extreme forms of Lissajous figures. If the modulus is measured at the highest strain, we would call it storage or elastic (real modulus). If the modulus is measured at the highest strain rate, it is called loss, or viscous (imaginary) modulus:

$$\varepsilon(t)=\varepsilon 0\sin(\omega t)$$

$$\sigma(t)=\varepsilon 0G\sin(\omega t+\delta)\text{ or }\sigma(t)=\varepsilon 0G'\sin(\omega t)+\varepsilon 0G''\cos(\omega t)$$

where G' is the storage or elastic modulus and G" is the loss or viscous modulus. Another form of representing storage and loss moduli is:

$$G(\omega)=G'(\omega)+jG''(\omega)\,|G(\omega)|=\sqrt{G'(\omega)^2+G''(\omega)^2}\tan\delta=\frac{G''(\omega)}{G'(\omega)}.$$

Similarly, the complex compliance $J(\omega)$ since at steady state $J(\omega)=1/G(\omega)$ is $$J(\omega)=J'(\omega)-jJ''(\omega)\,\forall\,(\omega)\Big|=\sqrt{J'(\omega)^2+J''(\omega)^2}\tan\delta=\frac{J''(\omega)}{J'(\omega)}.$$

Another often calculated harmonic response is the complex viscosity:

$$\eta(\omega)=\frac{G(\omega)}{j\omega}\eta(\omega)=\eta'(\omega)-j\eta''(\omega)\tan\delta=\frac{\eta'(\omega)}{\eta''(\omega)}.$$

The real part of viscosity is related to dissipated energy and $$\eta'(\omega)=\frac{G''(\omega)}{\omega},$$

while the imaginary part of viscosity is related to energy storage of material $$\eta''(\omega)=\frac{G'(\omega)}{\omega}.$$

Eventually the loss angle is given by: tan $$\delta=\frac{\eta'(\omega)}{\eta''(\omega)}=\frac{J''(\omega)}{J'(\omega)}=\frac{G''(\omega)}{G'(\omega)}.$$

Changes in tissue mechanical properties such as stiffness happens in various diseases. For example, cancerous masses, liver fibrosis, and calcification due to arteriosclerosis show change in tissue stiffness. Imaging technologies such as CT, MM, PET and ultrasound are being used to image the morphology of the tissue. Recently ultrasound elastography is being widely used to measure the tissue stiffness. Tissue characterization is useful at early stage disease detection when morphological changes may not be so apparent. Tissue characterization could also improve the accuracy of diagnosis by evaluating the size of the lesions and level of progression. Also, tissue characterization could provide some assessment of the response to certain treatment like radiofrequency ablation and chemotherapy.

If the material is homogenous and purely elastic, the elasticity can be easily described, but biological tissues are not homogenous and nor purely elastic. For example, atherosclerotic plagues are stiffer than healthy tissue and they become even stiffer by disease progression because their content changes from lipid to fibrosis and calcified tissue. Another example is malignant breast tumor which is resistant to deformation. This characteristic is one reason why some physicians perform palpation for early stage diagnosis. In fact, biological tissues are anisotropic, heterogenous, and nonlinear viscoelastic which make different deformation based on the direction and extent of the stress. Nevertheless, there is still high correlation between simple elastic modulus measurement with progression of the disease. One study showed that the Young's modulus of resected breast cancer was significantly higher than normal glandular tissue.

Mapping the stiffness can provide valuable information for physicians with relevant diagnostic values. This intuitive and practical simple relationship between palpation and elastography calls for applications wherever the palpation has been shown to be relevant for the elastography to be considered as a diagnostic tool. The advantages of elastography versus palpation are that elastography does not depend on the experience of the clinicians. Elastography is a quantifiable technique. Also, elastography can be used in deeper tissue than where palpation can be applied.

In ultrasound elastography, the differences of elasticity of biological tissues are defined by elastic modulus or Young modulus or by shear modulus. In ultrasound imaging technologies, these two moduli may be obtained either by acoustic radiation force impulse (ARFI) imaging or shear wave imaging techniques. In ARFI, Young's modulus is obtained by: $E=\sigma/\varepsilon$ and in shear wave imaging, Young's modulus is obtained by measuring the propagation speed of shear wave $E=2(1+\nu)G=3G=3\rho C^2S$. $\nu$ is the Poisson ratio of the tissue, G is the shear modulus, $\rho$ is the density of the tissue and C is the shear wave propagation speed in the tissue. It is assumed that the Poisson ratio for incompressible material is almost 0.5 and constant. Also, it is assumed that the density of the tissue is known and constant. Other terms used for these two techniques are strain imaging or quasi static imaging for ARFI imaging and dynamic method for shear wave imaging.

Elastography can be categorized by excitation method and the measured physical quantity such as follows: (1) Strain elastography: In this method the strain values within the region of interest are displayed and the excitation is a quasi-static method. It is a qualitative method; (2) Transient elastography: A controlled excitation pulse is applied to generate a shear wave and the speed of propagation of the shear wave is measured and Young's modulus is calculated. It is mostly used for liver tissue. (3) Acoustic Radiation Force Impulse (ARFI): Focused pulses are applied to the specified region and the displacement due to the excitation is measured. It is similar to strain imaging and also it is a qualitative method. (4) Shear Wave Speed Measurements and Imaging: Acoustic radiation forces are applied as pulses with short duration of time and the generated shear waves within the ROI is measured. The information is either presented as shear wave speed or Young's modulus, or an image is generated by that information.

The first form of elastography is strain imaging which is a method wherein pressure is applied by a probe on the body of the surface and tissue deformation is measured. The change in echo signal is obtained and the difference provides the strain:

$$\text{Strain } \varepsilon = \frac{d\delta}{dz} = \frac{\delta_2 - \delta_1}{L} \text{ and Young Modulus } E = \frac{\sigma}{\varepsilon}.$$

If stress is known, Young's modulus can be calculated, but it is not possible to know the distribution of stress in vivo, therefore, it is assumed to be uniform. The result is that the stiff segments show smaller strain and larger elastic modulus and relative stiffness is presented. In this method, the pressure is applied manually by clinicians and the result depends on the skill of the operator. Sometimes the pressure is applied by cardiovascular pulsation or respiration. For the superficial organs such as breast and thyroid, the pressure can be applied manually but for deeper organs such as the liver, manual pressure is not possible and either the cardiovascular pulsation or respiration is used for liver fibrosis strain imaging.

There are several ways to display the strain images. Since in this imaging, the strain is relative and an indicator to the stiffness, it changes due to the compression force. An elastogram may show that strain is normalized by its mean within the ROI in order to remove fluctuations due to the compression variation. Due to the importance of display and its effect on accurate diagnosis, often times the elastogram image is superimposed on a B-mode image. In various embodiments, users select the color scale. Since strain imaging is qualitative due to lack of assessment of the stress in vivo, it would be difficult to compare various cases. Solving the inverse problem is under investigation to quantify the elastic modulus under certain assumptions. But often the ratio of strain and the ratio of the size of tumor in an elastogram to the size of the low echo area in B-mode have been used. For practical reasons, a value called an elasticity score is used in clinics to differentiate a pattern of a tumor versus surrounding tissue for breast cancer diagnosis.

Figure 8:
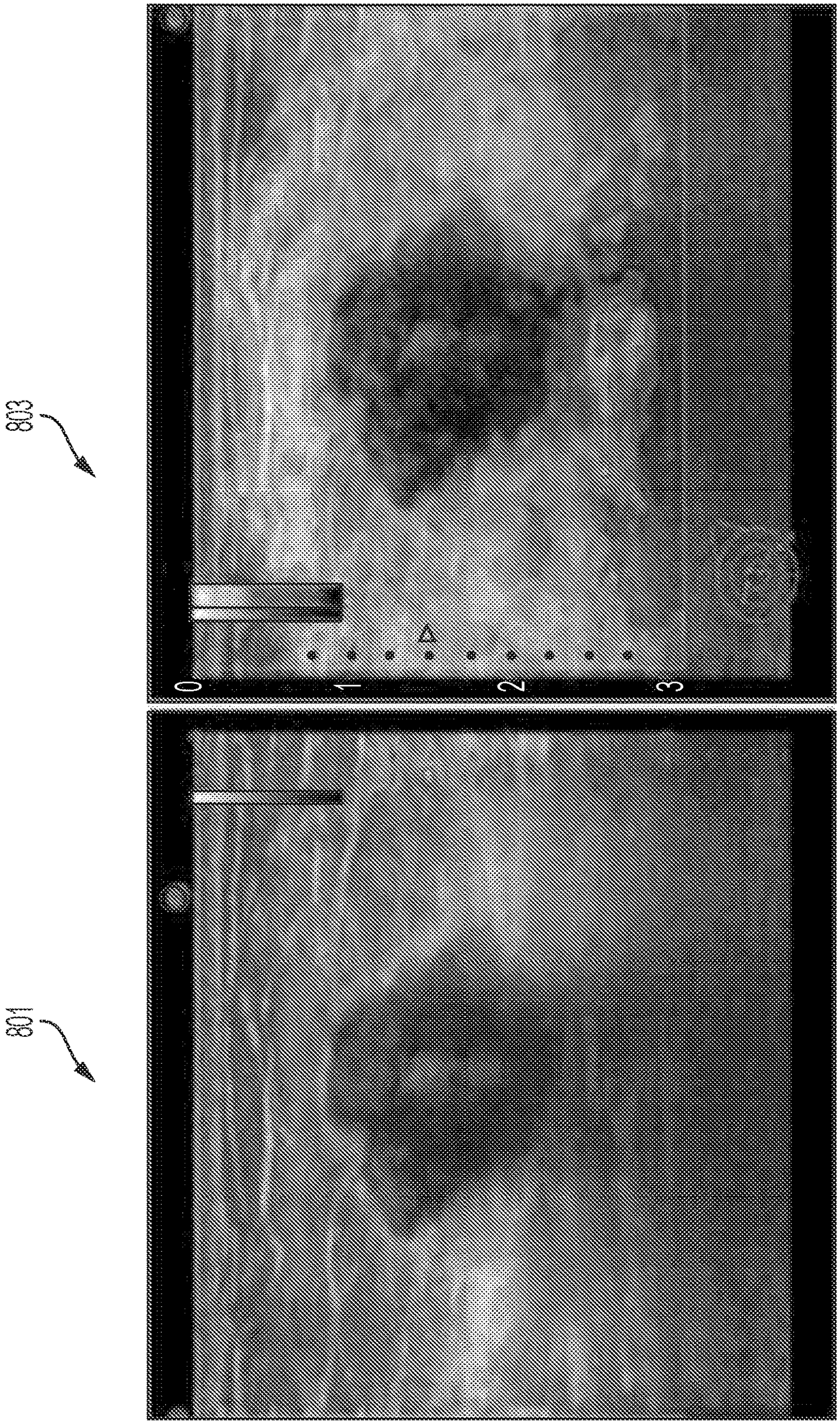
FIGS. 8-10 depict B-mode images and color elastograms of breast cancer, in accordance with various embodiments.
Figure 9:
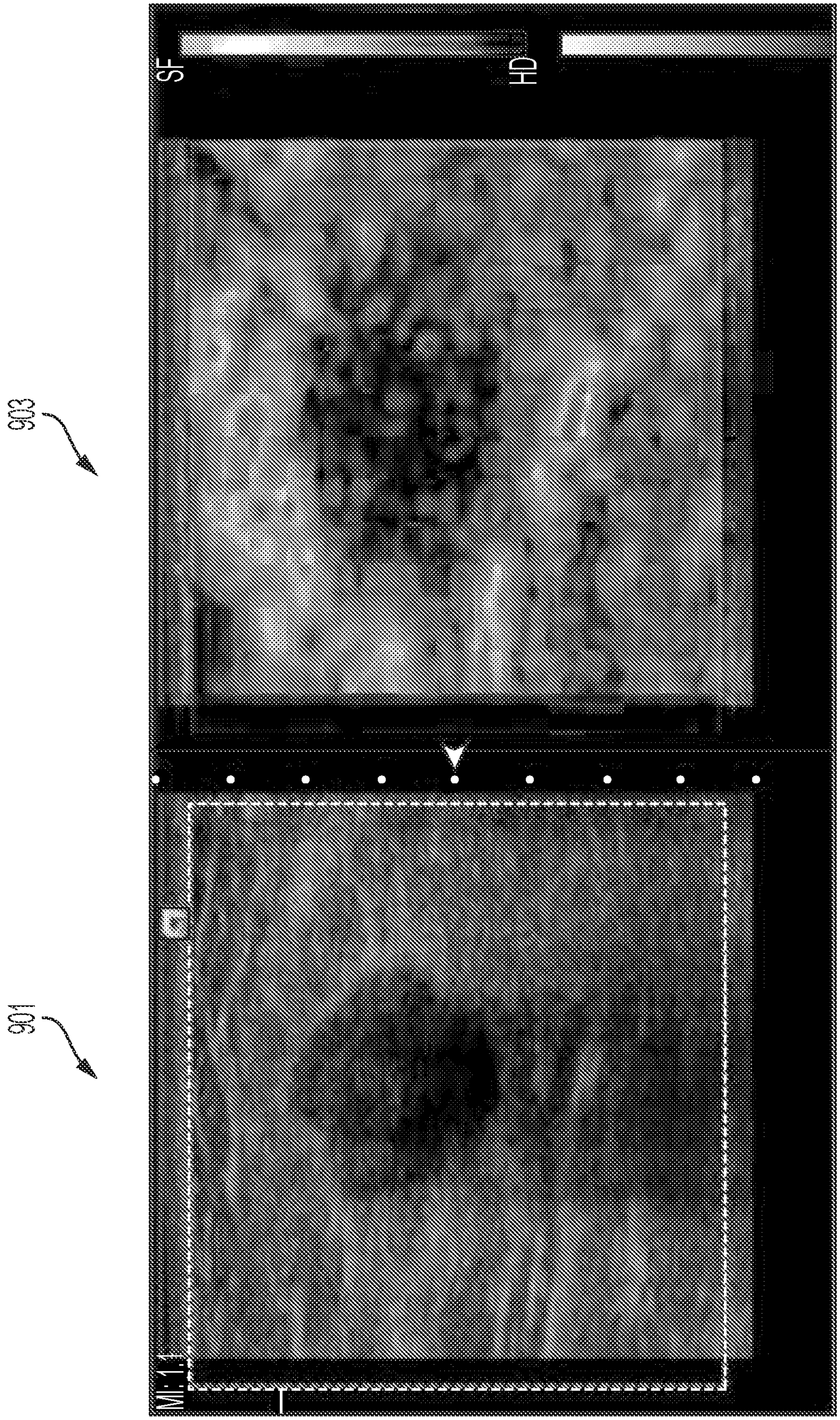
Figure 10:
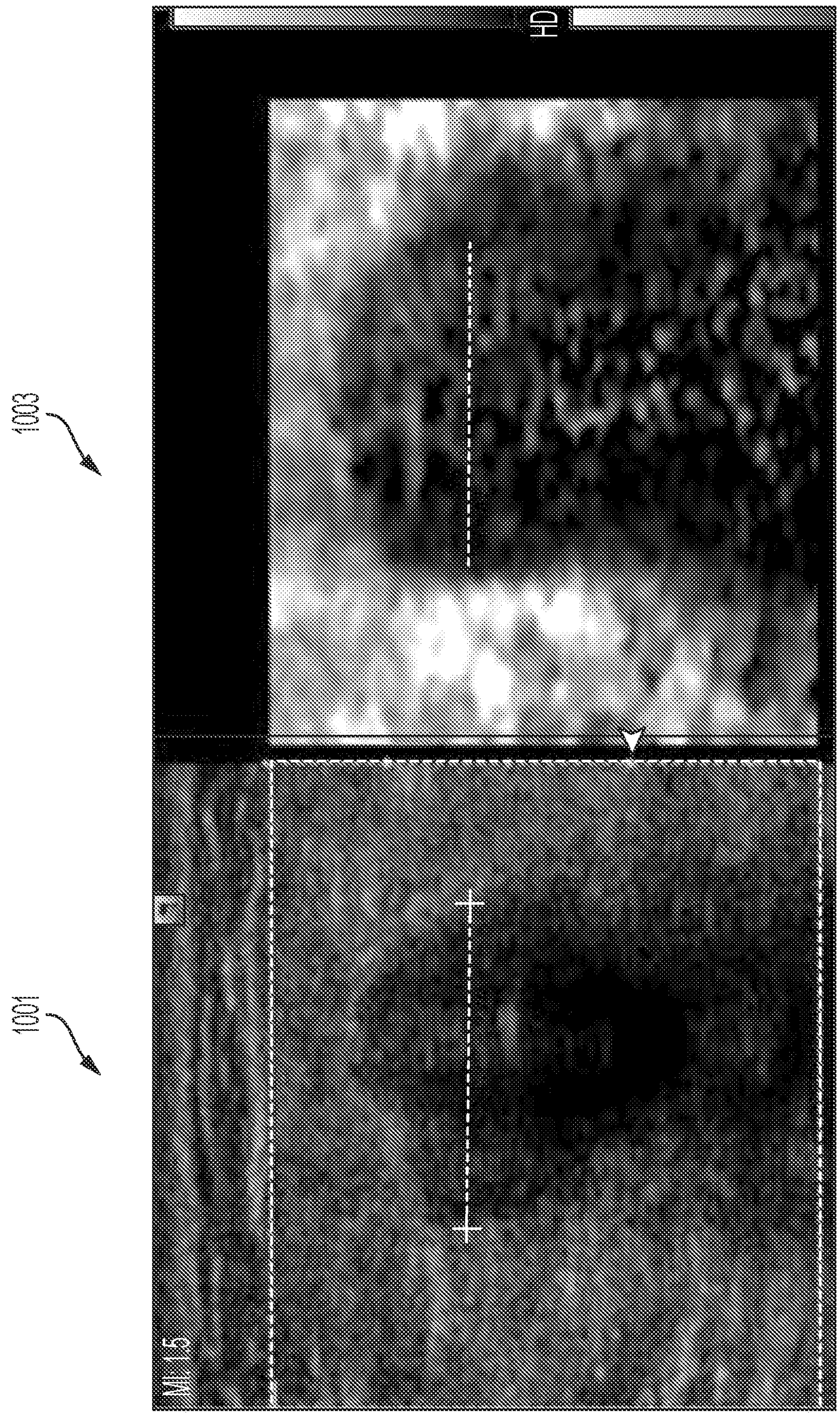

With reference to FIG. 8, a B-mode image of breast cancer 801 is shown and an color elastogram superimposed on a B-mode image 803 are shown. This figure illustrates a normalized strain as a means within the ROI to obtain stable images without being subjected to fluctuations in the intensity of compression. The translucent colored elastogram within the ROI is superimposed on the corresponding B-mode image; the average strain in the ROI, areas of low strain (stiff tissue), and areas of high strain (soft tissue) can be illustrated in different colors. With reference to FIG. 9, a similar image pair of B-mode image 901 and elastogram 903 is shown, but with a different color scale. In FIG. 10, yet another type of display is shown to illustrate a B-mode image 1001 and a greyscale elastogram 1003 shown side-by-side.

Figure 11:
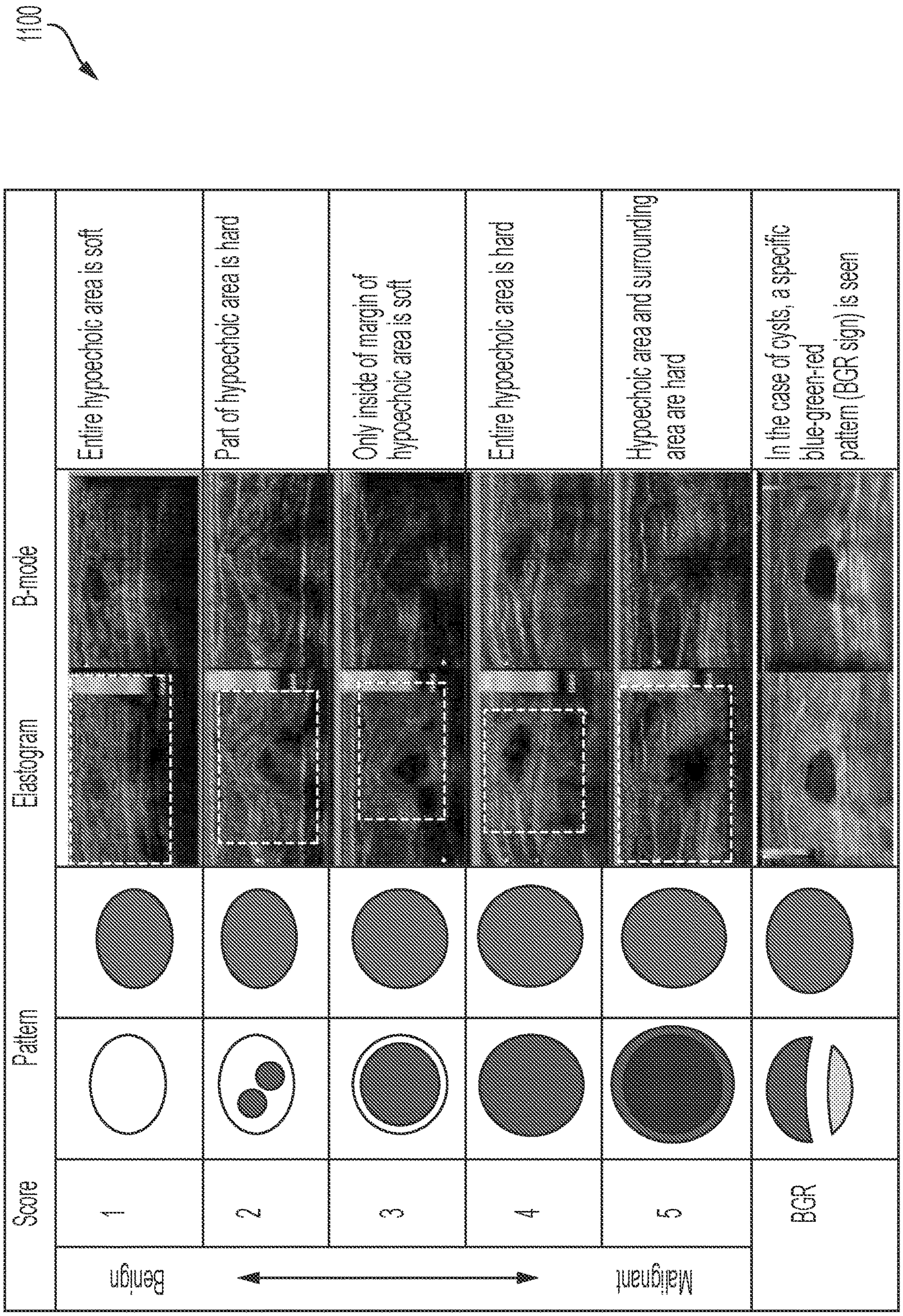
FIG. 11 illustrates a chart of elasticity scores in a breast cancer diagnosis and corresponding B-mode and elastogram images, in accordance with various embodiments.

FIG. 11 illustrates a chart 1100 of elasticity scores in a breast cancer diagnosis and corresponding B-mode and Elastogram images. The elasticity score is a five-point scale used to classify elastography patterns from benign to malignant as follows. Score 1 (benign), score 2 (probably benign), score 3 (benign or malignant are equivocal), score 4 (malignancy suspected), and score 5 (malignancy strongly suggested). In a case of cysts, a specific color pattern called a BGR sign is seen from a body surface side. This is a type of artifact, but because a level of the internal echo signals from a cyst is low, it can be used for cyst diagnosis, such as a lateral shadow or posterior enhancement on B-mode images.

Acoustic radiation force impulse (ARFI) imaging is another technique to assess elasticity of the tissue. In this method, the same transducer is used to apply the push pulse (focused pulse) and also used for monitoring the displacement or deformation of the tissue. Tissue is monitored before and after the push pulse. The deformation or displacement is inversely proportional to the stiffness of the tissue and directly proportional to the exerted acoustic force. Acoustic radiation force is a result of transfer of momentum from propagating ultrasound waves into the tissue. Propagation is affected by absorption and scattering mechanisms in the tissue. The acoustic radiation force (F) is related to the temporal average intensity of the acoustic wave and acoustic absorption coefficient of the tissue (a) and inversely related to the speed of wave in tissue (c):

$$F = \frac{2\alpha I}{c}.$$

Using probes and sequentially selecting a group of elements to which to apply the acoustic pulse and monitoring the displacement, an image of tissue displacement can be generated which would be similar to strain imaging. It shows the relative differences in tissue stiffness.

Unlike strain imaging, ARFI imaging does not rely upon manual pressure applied by the operator which limits the use of strain imaging on superficial tissues. ARFI can be applied deep in the body where the compression by the transducer cannot be practical. In order to avoid the nonlinear response of the tissue due to compression by the transducer, minimal compression should be applied during ARFI imaging.

The push pulses are longer than normal diagnostic pulses in order to generate enough force for an observable displacement. Therefore, the frame rate is low to maintain the mechanical index below the regulations limits. Because stress distribution is not uniform within the body and tissue, mechanical properties are not linear artifacts during strain elastography. In some cases, artifacts are recognizable by another image or information. Nonlinearity of the tissue becomes noticeable when the generated strain is more than several percent. Strains below 1% generate reproducible images.

Figure 12A:
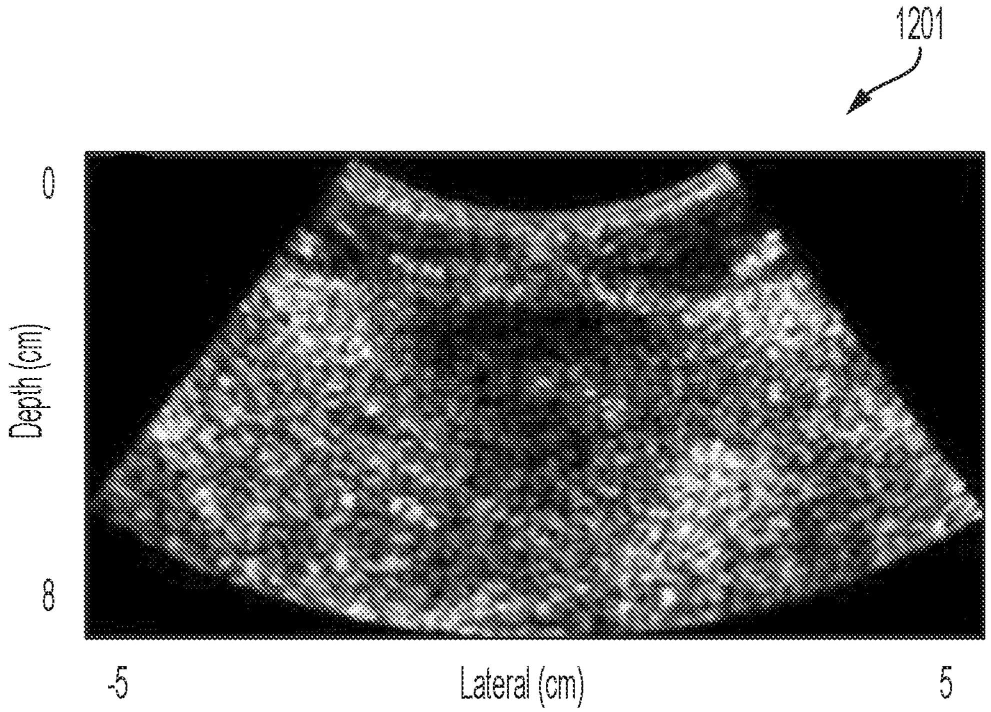
FIGS. 12A-B illustrate images of a metastatic melanoma mass in a liver, in accordance with various embodiments.
Figure 12B:
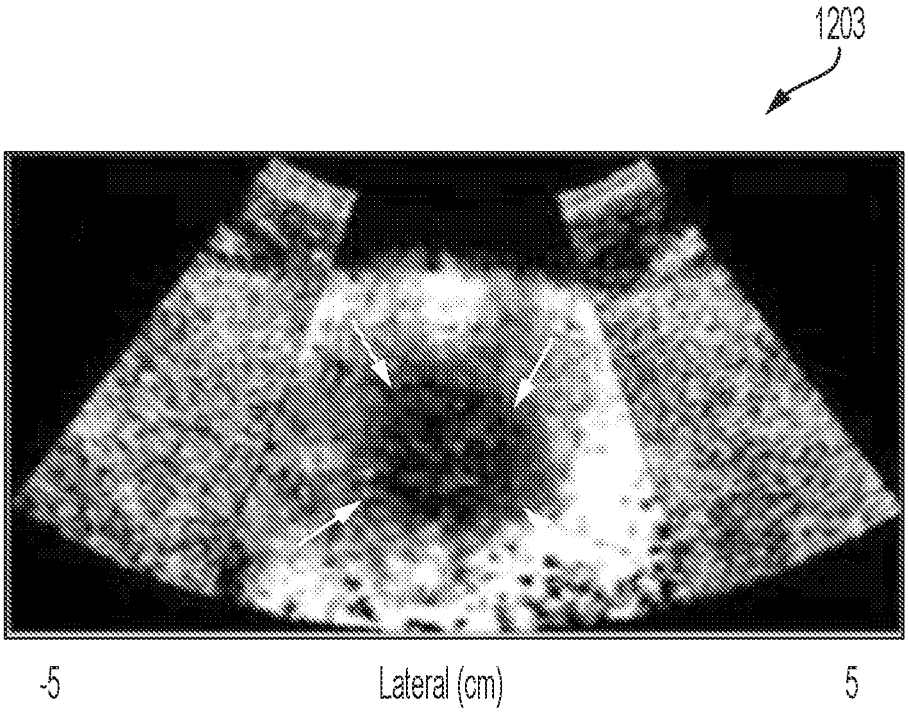
Figure 12C:
FIGS. 12C-D illustrate images of a hepatocellular carcinoma in a cirrhotic liver, in accordance with various embodiments.
Figure 12D:

FIGS. 12A and 12B illustrate a B-mode image 1201 and ARFI image 1203 respectively. The images 1201, 1203 show a metastatic melanoma mass in an otherwise healthy liver. The mass appears as a hypoechoic region in the B-mode image 1201; in the corresponding ARFI image 1203, the malignant mass does not displace (darker region) as much as the background liver tissue (white) and can be interpreted to be stiffer than the liver tissue. FIGS. 12C and 12D illustrate a B-mode image 1205 and ARFI image 1207. The B-mode image 1205 and ARFI image 1207 illustrate hepatocellular carcinoma in a cirrhotic liver. In the ARFI image 1207, the mass appears more compliant (i.e., displaces more) than the stiffer, diseased liver tissue.

Artifacts can arise due to stress concentration. Strain is used as the index of stiffness instead of Young's modulus on the assumption that stress is uniform. However, in practice, stress tends to concentrate on curved boundaries so that strain increases along a boundary compared with the adjacent area. This phenomenon causes artifacts such that the region near the boundary looks softer than the adjacent area. A muscle may be uniformly blue or black in grayscale (small strain) when elastography is performed with proper compression, but when the pectoralis major muscle is red, or white in grayscale (large strain) and the subcutaneous fat layer has blue (or black in grayscale) mixed in, it often means that excessive compression has been used.

In the case of biological tissue, when the compression is intensified, Young's modulus, i.e., stiffness, tends to increase and the contrast between fat and a malignant mass decreases. The extent of nonlinearity differs from tissue to tissue. For example, when the degree of compression is slight, the difference in Young's modulus between breast tissue and tumor is large, and the tumor is clearly displayed as a relatively low strain region. But when the compression is too strong, the stiffness of the mammary gland increases, and the difference between it and the tumor will be smaller, possibly resulting in a false negative finding.

Shear wave measurement and imaging provides a third technique. Shear waves generated by propagation of ultrasound waves travel in the perpendicular direction to the ultrasound propagation and they can be monitored as an indication of tissue displacement. In shear wave imaging, a speed of shear wave propagation inside the tissue is estimated. This speed is related to stiffness of Young's modulus. The important assumptions in this technique are that the material is homogenous, isotropic and linear. Also, the technique assumes that the density of the ROI is constant and known. The relationship between shear wave speed and young modulus is as follows:

$$E = 3G = 3\rho C_S^2.$$

There various ways of generating shear waves such as external vibration, physiological motions, and acoustic radiation force. Shear wave methods that employ external excitation are either monitored by ultrasound imaging which is called transient elastography or monitored by magnetic resonance imaging which is called magnetic resonance elastography (MRE). In ultrasound shear wave elastography, the excitation is generated by pulses, but in MRE, continuously vibrating sources are used. MRE produces an image of shear modulus but ultrasound methods report the speed of shear wave or Young's modulus.

Some ultrasound systems use a piston that punches the body surface and the propagation of shear wave is monitored by ultrasound transducer. The imaging transducer is located at a fixed position and the shear wave speed measured is the average of shear wave speed in the region imaged by the transducer. Some systems report only the Young's modulus and are design primarily for liver stiffness measurement without displaying the B-mode.

Some systems use acoustic radiation force (ARFI) to generate shear wave. In this mechanism, a focused acoustic beam pulse is applied. The pulse causes a shear wave propagating in an orthogonal direction of the beam which is monitored by ultrasound imaging. Shear wave image can be overlapped with B-mode image. The speed in the ROI is reported as a number or a 2D image that portrays the shear wave speed at a rate of up to a few frames per second is displayed.

Figure 13:
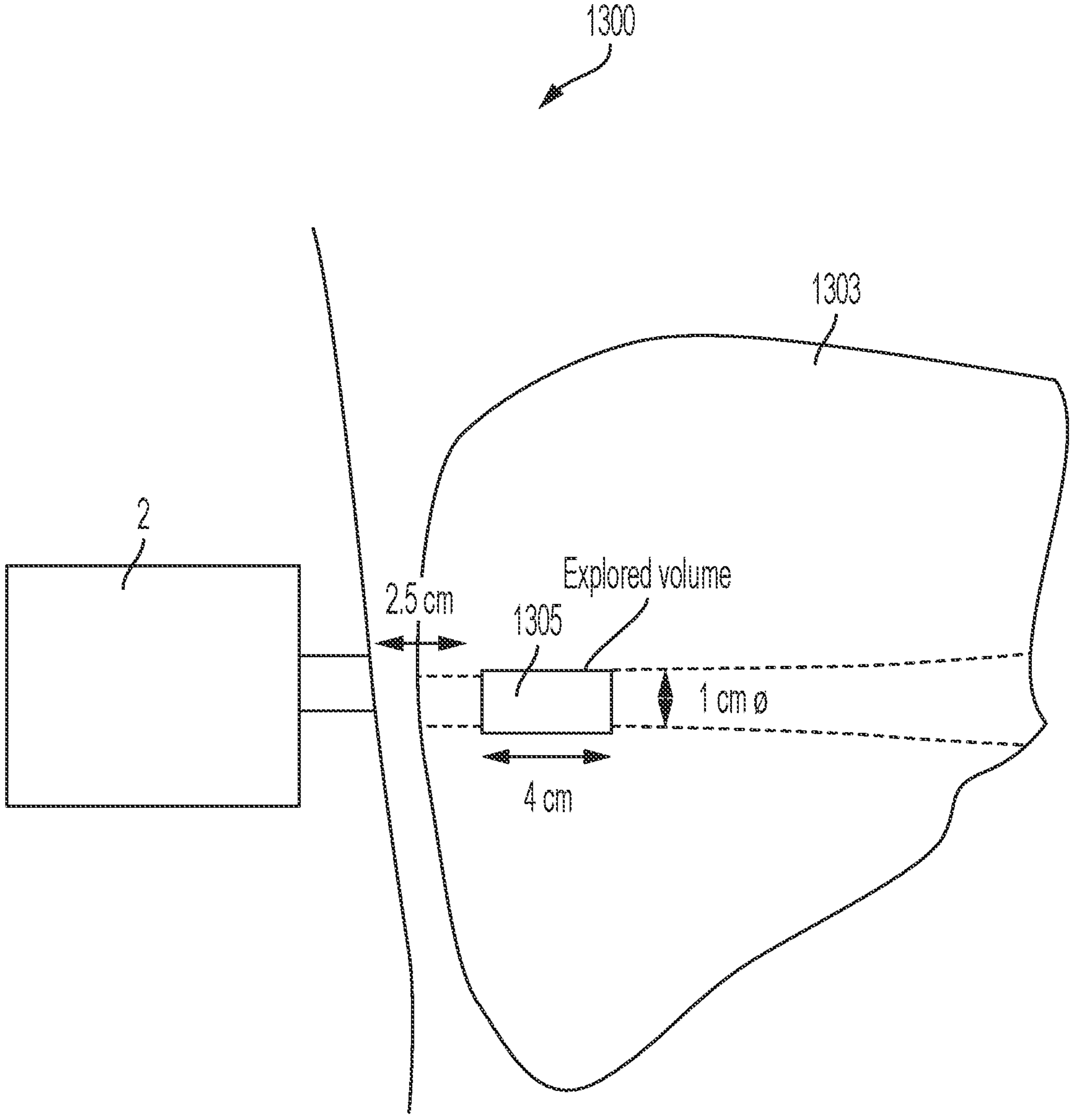
FIG. 13 shows a diagram of a shear wave measurement scenario, in accordance with various embodiments.
Figure 14:
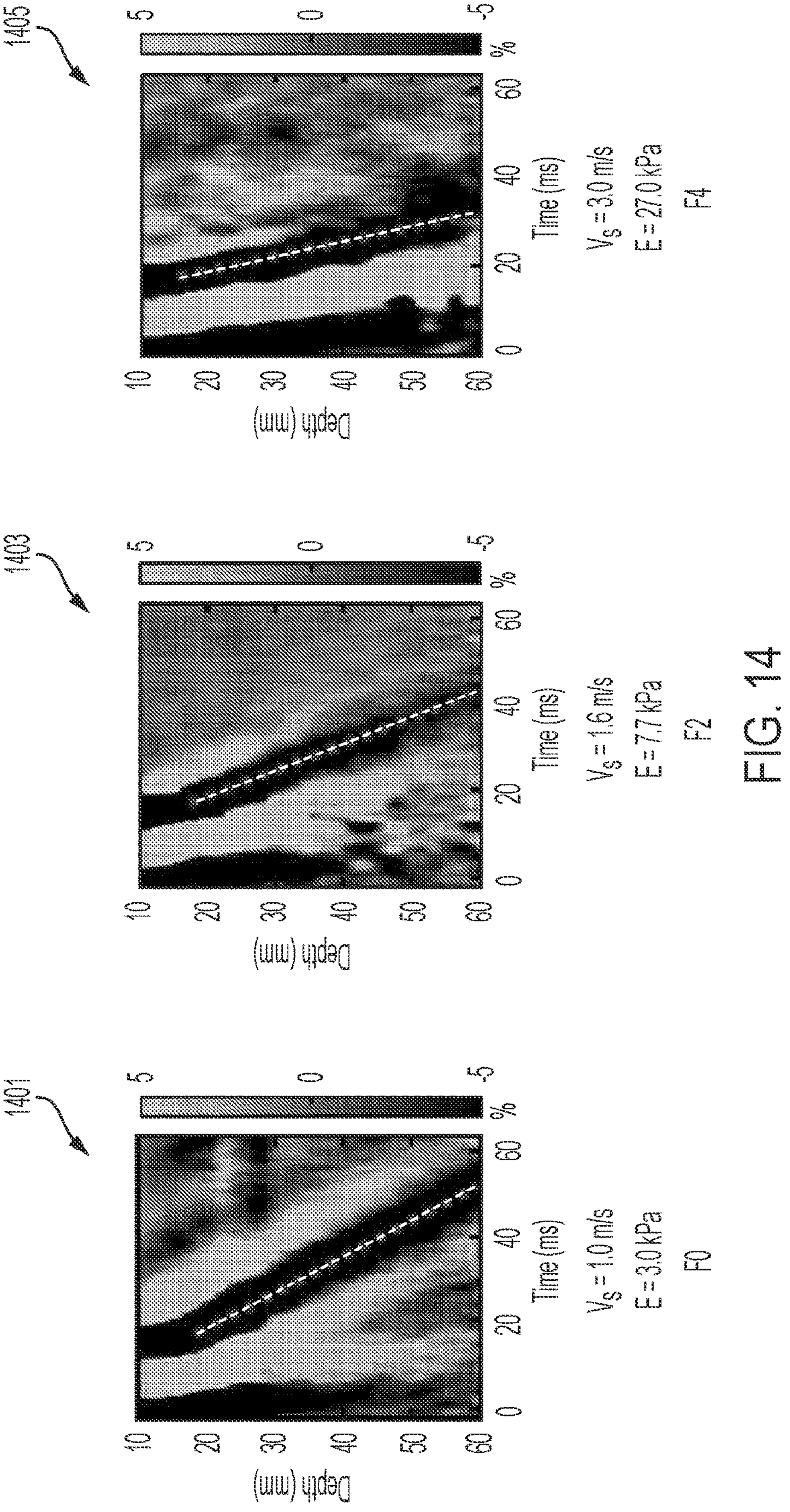
FIG. 14 shows illustrations of shear wave propagation according to the severity of hepatic fibrosis of the tissue, in accordance with various embodiments.

FIG. 13 shows a diagram 1300 of a shear wave measurement scenario. A probe 1307 is positioned near a tissue 1303 and explores an explored volume 1305 of the tissue 1303. FIG. 14 shows illustrations of shear wave propagation according to the severity of hepatic fibrosis of the tissue 1303 (FIG. 13). The elastic modulus E expressed as E 53r2, where V is the shear velocity and r is the mass density (constant and close to 1 kg/m3 for tissue): the stiffer the tissue, the faster the shear wave propagates. In the absence of fibrosis (F0), the velocity is 1.0 m/s and elasticity is 3 kPa in a first illustration 1401 whereas with cirrhosis (F4), the velocity is 3.0 m/s and elasticity is 27 kPa in a third illustration 1405. A second illustration 1403 illustrates an intermediate stiffness (F2) and corresponding shear wave propagation.

Figure 15A:
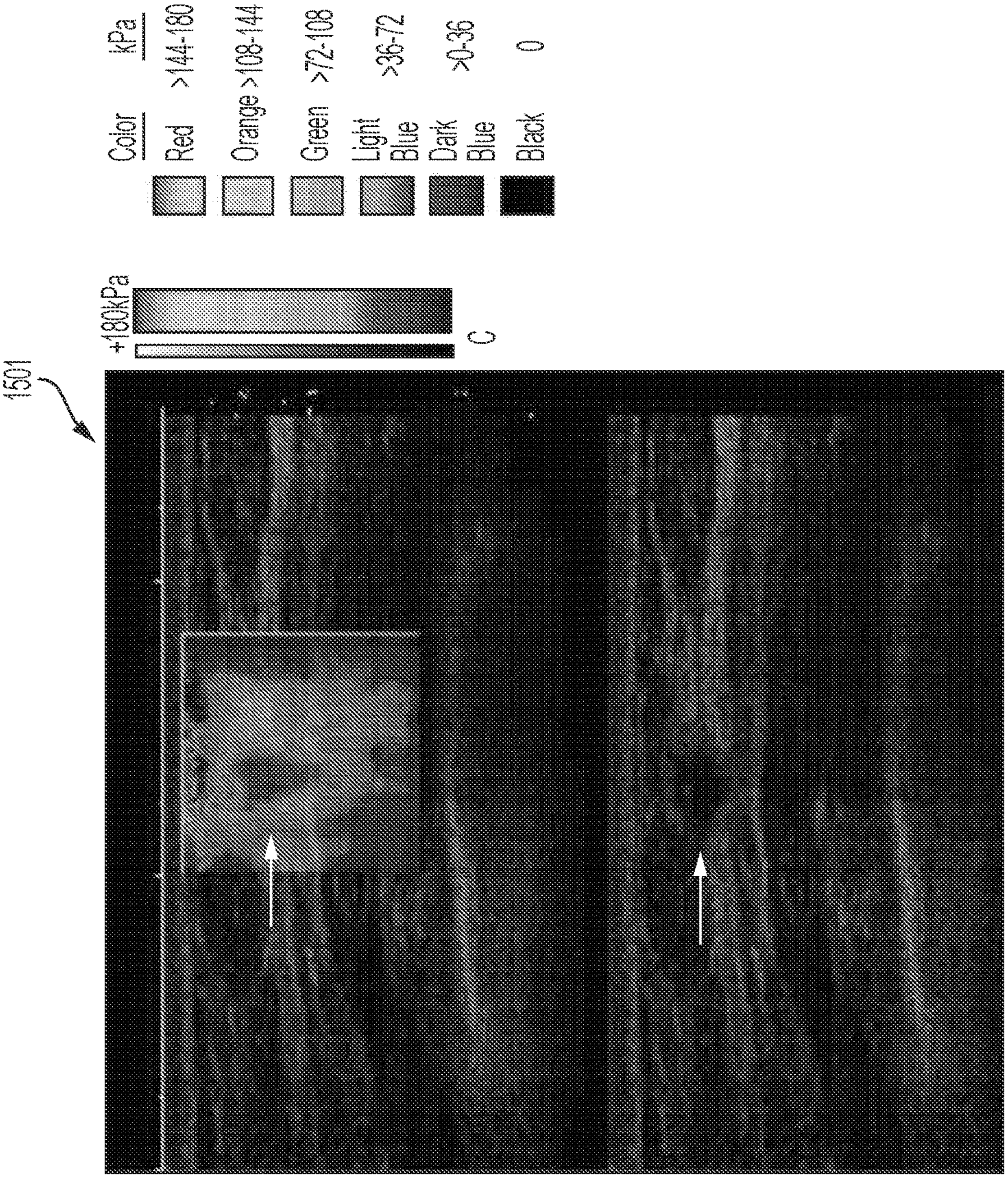
FIG. 15A shows an illustration of example breast shear wave image and a corresponding B-mode image of a biopsy confirmed infiltrating ductal carcinoma, in accordance with various embodiments.
Figure 15B:
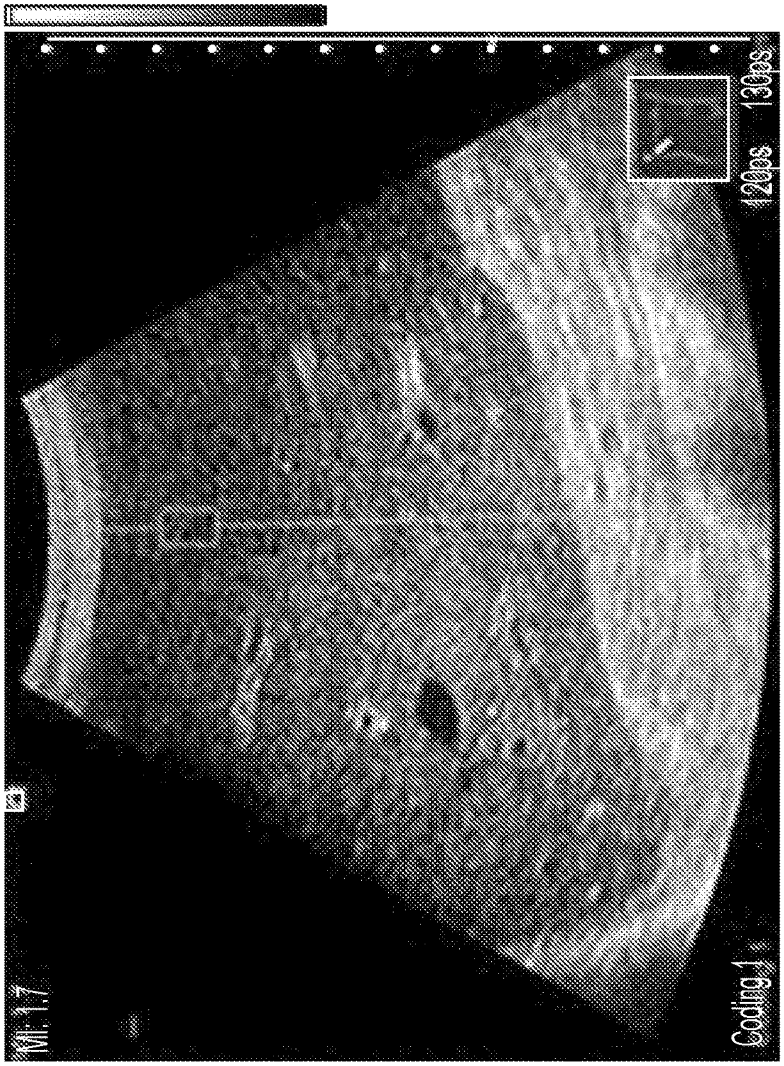
FIG. 15B shows an image of example point measurement of local shear wave speed in a liver obtained via an acoustic radiation force impulse (ARFI) method, in accordance with various embodiments.

Similarly, FIG. 15A shows an illustration 1501 of example breast shear wave image and a corresponding B-mode image of a biopsy confirmed infiltrating ductal carcinoma, which is very stiff (E5 180 kPa, or 7.7 m/s), making it highly suspicious for malignancy. FIG. 15B shows an image 1503 of example point measurement of local shear wave speed in a liver obtained via an ARFI method.

Biological tissues are known to be nonlinear, heterogeneous and viscoelastic. Due to these mechanical properties, the propagation of acoustic waves in these materials are very different than what has been modeled by linear, homogenous and elastic materials. Just including the effect of viscosity implies that the stiffness and shear wave speed depends on the excitation frequency or known as dispersion. Dispersion is one reason there are differences between various commercial systems in shear wave imaging. Nonlinearity of the tissue indicates that the response to stress depends on the initial strain of the material. Therefore, the values of strain depend on tissue compression which happened both in strain imaging and shear wave imaging. In some embodiments, the increasing transducer compression during breast and prostate cancer measurement results in increasing shear wave speeds. This is one reason that applying minimal compression may be desirable to improve the reproducibility of the shear wave technique.

Nonhomogeneity of the tissue can cause artifacts and leads to incorrect shear wave estimation. At the structural interfaces, the reflection of shear wave could result in a soft center artifact in a very stiff lesion. It is recommended to exclude the structural boundaries that can be recognized by B-mode imaging when performing shear wave imaging.

Figure 16:
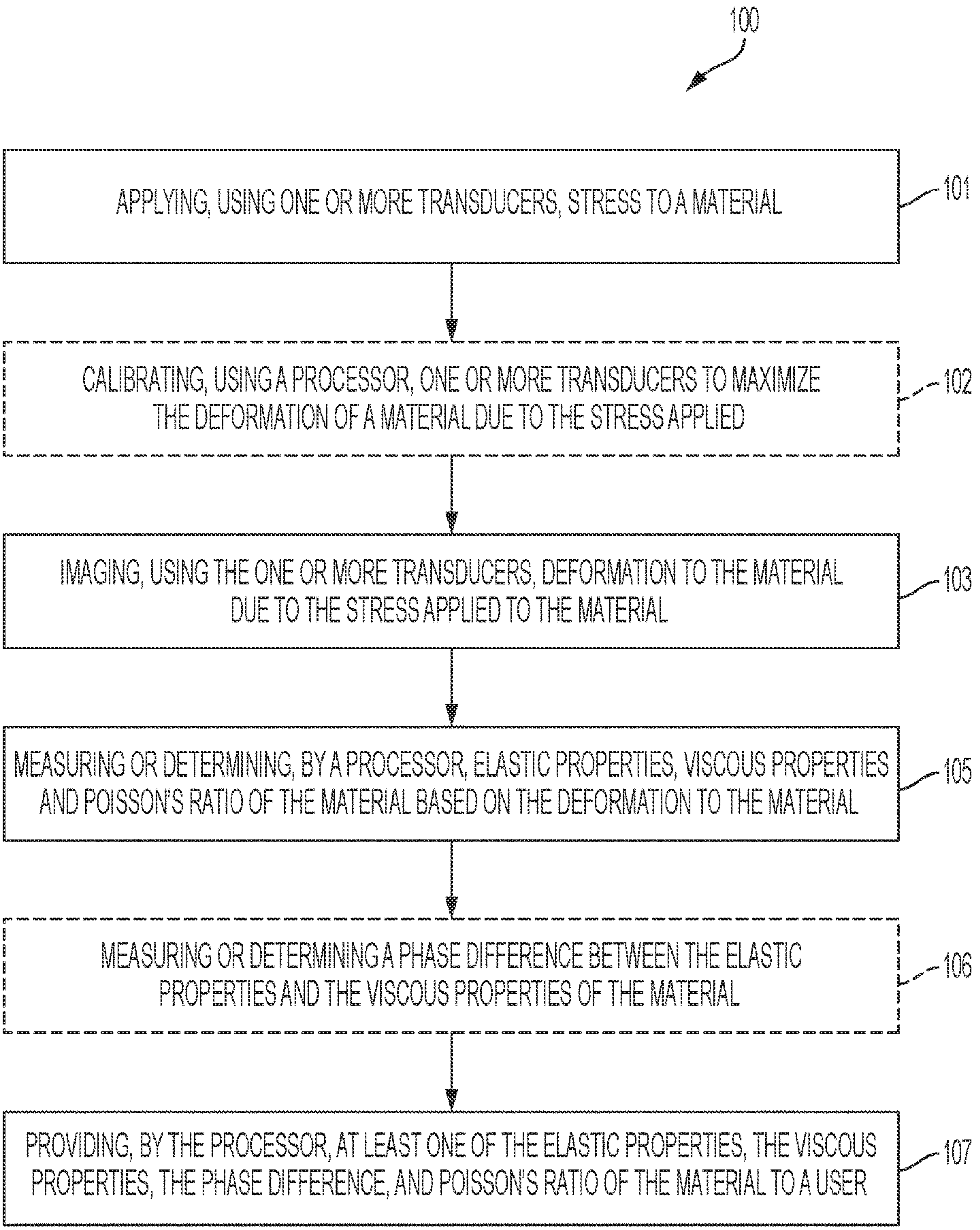
FIG. 16 depicts a non-contact method to quantify the viscoelastic properties of a material, in accordance with various embodiments.

Having now introduced and explained a variety of operative principles and a system for non-contact ultrasound viscoelastic spectroscopy, attention is directed to FIG. 16 and a non-contact method to quantify the viscoelastic properties of a material using the disclosed system (method 100). The method 100 includes applying, using one or more transducers, stress to a material (block 101). The method 100 may optionally include calibrating, using a controller, one or more transducers to maximize the deformation of a material due to the stress applied (block 102). The method includes imaging, using the one or more transducers, deformation to the material due to the stress applied to the material (block 103). The method further includes, measuring or determining, by a controller, elastic modulus, viscous modulus, and Poisson's ratio of the material based on the deformation to the material (block 105). The method 100 optionally contemplates measuring or determining a phase difference between the elastic modulus and the viscous modulus of the material (block 106). Finally, the method includes providing, by the controller, the elastic modulus, the viscous modulus, Poisson's ratio of the material to a user (block 107), such as by displaying on a human-machine interface. The providing aspect may also include providing the phase difference to the user.

Applying the stress to the material may be by emitting, by the one or more transducers, ultrasonic energy directed at the material to deform the material. Additionally, the controller may calibrate the transducers to maximize the deformation to the material due to the stress applied (see block 102). This may be by changing a waveform or other signal characteristic of the applied energy. This may be by receiving, from the one or more transducers, a reflection of the ultrasonic energy directed at the material and adjusting, using the controller, a position of the one or more transducers to maximize an amount of the reflection of the ultrasonic energy that is received. Moreover, the one or more transducers may by spaced away from the material and not contacting the material so as to preserve the integrity and prevent the destruction of the material.

When applying the stress to the material using the one or more transducers, the stress may be applied over a period of time. When measuring or determining the elastic modulus, the viscous modulus, and Poisson's ratio of the material, the measuring or determining may be a measuring or determining of a time response of the deformation of the material due to the stress applied over the period of time. This time response may correspond to the elastic modulus and to the viscous modulus of the material. A faster time response indicates that the material is more elastic, and a slower time response indicates that the material is more inviscid. The material deformation pattern may indicate the Poisson's ratio, which may be calculated from the material deformation pattern to indicate the material internal stress. In some instances, a phase difference between the elastic modulus and the viscous modulus of the material is also measured or determined (see block 106).

Exemplary embodiments of the methods/systems have been disclosed in an illustrative style. The terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A non-contact method to quantify the viscoelastic properties of a material placed on a movable platform, comprising:

applying, using a first transducer, ultrasonic energy to the material;

receiving, by a third transducer, reflection energy of the ultrasonic energy;

adjusting, using a controller, the movable platform based on an amount of the reflection energy received by the third transducer;

emitting, using the first transducer, a sine waveform pressure field with different frequencies towards the material;

imaging, using a second transducer, deformations to the material due to the sine waveform pressure field at different frequencies applied to the material; and measuring or determining, by the controller, elastic modulus, viscous modulus and Poisson's ratio of the material based on the deformations to the material.

2. The non-contact method of claim 1, further comprising displaying using a display, a time response of the elastic modulus, the viscous modulus, and the Poisson's ratio of the material; and wherein a faster time response indicates that the material is more elastic, and a slower time response indicates that the material is more viscous.

3. The non-contact method of claim 2, wherein the Poisson's ratio of the material indicates a material internal stress.

4. The non-contact method of claim 1, further comprising measuring or determining, by the controller, a phase difference between reflected ultrasonic waves from the material emitted or originated from the sine waveform pressure field.

5. A contactless system to quantify the viscoelastic moduli of a material, comprising:

a moveable platform for the material;

a first ultrasound transducer spaced apart from the material and configured to emit waveforms of pressure field with varying frequencies towards the material to deform the material;

a second ultrasound transducer spaced apart from the material and configured to image over time the material deformations;

a moveable platform to hold, position, or orient the material relative to the first ultrasound transducer or the second ultrasound transducer; and a controller coupled to the first ultrasound transducer and the second ultrasound transducer and configured to:

adjust the movable platform based on an amount of reflection energy from a reflection of the waveforms emitted by the first ultrasonic transducer;

obtain, from the second ultrasound transducer, the images over time of the material deformations; and determine a time response of elastic modulus, viscous modulus, and Poisson's ratio of the material based on the images over time.

6. The contactless system of claim 5, further comprising a third ultrasound transducer configured to receive the reflection of the waveforms of the pressure field with varying frequencies used to deform the material, wherein the controller is further coupled to the third ultrasound transducer and is further configured to:

measure the reflection of the waveforms of the pressure field with varying frequencies, and position the first ultrasound transducer to calibrate a position of the first ultrasound transducer based on the measurement of the reflection of the waveforms of the pressure field with varying frequencies.

7. The contactless system of claim 6, wherein the first ultrasound transducer, the second ultrasound transducer and the third ultrasound transducer are positioned a distance away from the material such that the first ultrasound transducer, the second ultrasound transducer and the third ultrasound transducer are not in contact with the material and not destructive to the material.

8. The contactless system of claim 5, wherein the controller is configured to measure or determine a phase difference between reflected ultrasonic waves from the material emitted or originated from the waveforms of the pressure field.

9. The contactless system of claim 5, wherein the first, the second and the third ultrasound transducers have the same dimensions, the same resonance frequency and the same power output.

10. The contactless system of claim 5, further comprising a third ultrasound transducer configured to receive the reflection of the waveforms of the pressure field with varying frequencies, wherein the first, the second, and the third ultrasound transducers have different dimensions, different resonance frequency and different power output.

11. The contactless system of claim 5, further comprising a third ultrasound transducer configured to receive the reflection of the waveforms of the pressure field with varying frequencies, wherein the first, the second, and the third ultrasound transducers have at least one different dimension, frequency or power output.

12. The contactless system of claim 5, further comprising a third ultrasound transducer configured to receive the reflection of the waveforms of the pressure field with varying frequencies, wherein the first ultrasound transducer is positioned at an oblique angle with respect to a surface of the material.

13. The contactless system of claim 5, further comprising a display configured to display a time response of the elastic modulus, the viscous modulus, and the Poisson's ratio of the material; and wherein a faster time response indicates that the material is more elastic, and a slower time response indicates that the material is more viscous.

* * * * *